(12) United States Patent
Ogino

(10) Patent No.: US 9,680,272 B2
(45) Date of Patent: Jun. 13, 2017

(54) METHOD FOR FORMING NEGATIVE ELECTRODE AND METHOD FOR MANUFACTURING LITHIUM SECONDARY BATTERY

(71) Applicant: SEMICONDUCTOR ENERGY LABORATORY CO., LTD., Atsugi-shi, Kanagawa-ken (JP)

(72) Inventor: Kiyofumi Ogino, Kanagawa (JP)

(73) Assignee: Semiconductor Energy Laboratory Co., Ltd., Kanagawa-ken (JP)

(*) Notice: Subject to any disclaimer, the term of this patent is extended or adjusted under 35 U.S.C. 154(b) by 847 days.

(21) Appl. No.: 13/763,861

(22) Filed: Feb. 11, 2013

(65) Prior Publication Data

US 2013/0212879 A1 Aug. 22, 2013

(30) Foreign Application Priority Data

Feb. 17, 2012 (JP) .................................. 2012-032782

(51) Int. Cl.
*H01R 43/00* (2006.01)
*H01R 43/16* (2006.01)
(Continued)

(52) U.S. Cl.
CPC .......... *H01R 43/16* (2013.01); *H01M 4/0404* (2013.01); *H01M 4/049* (2013.01);
(Continued)

(58) Field of Classification Search
CPC .. H01R 43/16; H01M 4/0404; H01M 4/0471; H01M 4/049; H01M 4/133; H01M 4/134;
(Continued)

(56) References Cited

U.S. PATENT DOCUMENTS 6,828,015 B2 12/2004 Hirata et al.
7,179,561 B2 2/2007 Niu et al.
(Continued)

FOREIGN PATENT DOCUMENTS

CN 101098026 A 1/2008
CN 101527202 A 9/2009
(Continued)

OTHER PUBLICATIONS

Su.F et al., "Flexible and planar graphene conductive additives for lithium-ion batteries,", J. Mater. Chem. (Journal of Materials Chemistry), 2010, vol. 20, pp. 9644-9650.
(Continued)

*Primary Examiner* — Peter DungBa Vo
*Assistant Examiner* — Azm Parvez
(74) *Attorney, Agent, or Firm* — Nixon Peabody LLP; Jeffrey L. Costellia

(57) ABSTRACT

The number of steps is reduced in the formation process of an electrode. Deterioration of the electrode is suppressed. A highly reliable lithium secondary battery is provided by suppressing the deterioration of the electrode. A method for forming a negative electrode and a method for manufacturing a lithium secondary battery including the negative electrode are provided. In the method for forming the negative electrode, graphene oxide, a plurality of particulate negative electrode active materials, and a precursor of polyimide are mixed to form slurry; the slurry is applied over a negative electrode current collector; and the slurry applied over the negative electrode current collector is heated at a temperature higher than or equal to 200° C. and lower than or equal to 400° C. so that the precursor of the polyimide is imidized. The graphene oxide is reduced in heating the slurry to imidize the precursor of the polyimide.

10 Claims, 13 Drawing Sheets

(51) Int. Cl.
*H01M 4/04* (2006.01)
*H01M 4/133* (2010.01)
*H01M 4/134* (2010.01)
*H01M 4/1393* (2010.01)
*H01M 4/1395* (2010.01)
*H01M 4/587* (2010.01)
*H01M 4/62* (2006.01)
*H01M 4/131* (2010.01)
*H01M 4/1391* (2010.01)
*H01M 4/38* (2006.01)
*H01M 4/48* (2010.01)
*H01M 4/66* (2006.01)

(52) U.S. Cl.
CPC ......... *H01M 4/0471* (2013.01); *H01M 4/133* (2013.01); *H01M 4/134* (2013.01); *H01M 4/1393* (2013.01); *H01M 4/1395* (2013.01); *H01M 4/386* (2013.01); *H01M 4/587* (2013.01); *H01M 4/622* (2013.01); *H01M 4/625* (2013.01); *H01M 4/131* (2013.01); *H01M 4/1391* (2013.01); *H01M 4/38* (2013.01); *H01M 4/48* (2013.01); *H01M 4/661* (2013.01); *H01M 4/669* (2013.01); *Y02P 70/54* (2015.11); *Y10T 29/49224* (2015.01)

(58) Field of Classification Search
CPC .... H01M 4/1393; H01M 4/386; H01M 4/587; H01M 4/622; H01M 4/625; H01M 4/131; H01M 4/38; H01M 4/48; H01M 4/661; H01M 4/669; Y10T 29/49; Y10T 29/49002; Y10T 29/49108; Y10T 29/49115; Y10T 29/49117; Y10T 29/49204; Y10T 29/49224
USPC ........ 29/885, 874, 825, 592.1, 623.5, 623.1; 429/231.8, 209, 212, 213, 217, 218.1, 429/226, 484
See application file for complete search history.

(56) References Cited

U.S. PATENT DOCUMENTS

| | | | |
|---|---|---|---|
| 7,572,542 B2 | 8/2009 | Naoi | |
| 7,745,047 B2 | 6/2010 | Zhamu et al. | |
| 7,842,432 B2 | 11/2010 | Niu et al. | |
| 7,939,218 B2 | 5/2011 | Niu | |
| 7,977,007 B2 | 7/2011 | Niu et al. | |
| 7,977,013 B2 | 7/2011 | Niu et al. | |
| 8,147,791 B2 | 4/2012 | Gilje | |
| 8,278,011 B2 | 10/2012 | Zhu et al. | |
| 8,771,873 B2 | 7/2014 | Fukui et al. | |
| 9,045,346 B2 | 6/2015 | Nesper et al. | |
| 9,334,368 B2 | 5/2016 | Hirano et al. | |
| 2003/0186059 A1 | 10/2003 | Hirata et al. | |
| 2007/0009799 A1 | 1/2007 | Zheng | |
| 2007/0131915 A1 | 6/2007 | Stankovich et al. | |
| 2007/0160842 A1 | 7/2007 | Hirata et al. | |
| 2008/0048153 A1 | 2/2008 | Naoi | |
| 2008/0254296 A1 | 10/2008 | Handa et al. | |
| 2009/0110627 A1 | 4/2009 | Choi et al. | |
| 2009/0117467 A1 | 5/2009 | Zhamu et al. | |
| 2009/0123850 A1 | 5/2009 | Takeuchi et al. | |
| 2009/0252891 A1 | 10/2009 | Hirata et al. | |
| 2009/0253045 A1 | 10/2009 | Kotato et al. | |
| 2009/0305135 A1 | 12/2009 | Shi et al. | |
| 2010/0081057 A1 | 4/2010 | Liu et al. | |
| 2010/0143798 A1 | 6/2010 | Zhamu et al. | |
| 2010/0176337 A1 | 7/2010 | Zhamu et al. | |
| 2010/0233538 A1 | 9/2010 | Nesper et al. | |
| 2010/0233546 A1 | 9/2010 | Nesper et al. | |
| 2010/0248034 A1 | 9/2010 | Oki et al. | |
| 2010/0301279 A1 | 12/2010 | Nesper et al. | |
| 2010/0308277 A1 | 12/2010 | Grupp et al. | |
| 2010/0330421 A1 | 12/2010 | Cui et al. | |
| 2011/0012067 A1 | 1/2011 | Kay | |
| 2011/0111303 A1* | 5/2011 | Kung | H01B 1/18 429/231.8 |
| 2011/0121240 A1* | 5/2011 | Amine | H01M 4/0402 252/502 |
| 2011/0159372 A1 | 6/2011 | Zhamu et al. | |
| 2011/0229795 A1 | 9/2011 | Niu et al. | |
| 2012/0045692 A1 | 2/2012 | Takemura et al. | |
| 2012/0058397 A1 | 3/2012 | Zhamu et al. | |
| 2012/0088151 A1 | 4/2012 | Yamazaki et al. | |
| 2012/0088156 A1 | 4/2012 | Nomoto et al. | |
| 2012/0100402 A1 | 4/2012 | Nesper et al. | |
| 2012/0129048 A1* | 5/2012 | Fukui | C08G 73/1017 429/217 |
| 2012/0148924 A1* | 6/2012 | Ogino | H01G 11/06 429/341 |
| 2012/0153234 A1 | 6/2012 | Gilje | |
| 2012/0196184 A1* | 8/2012 | Tanaka | H01M 4/133 429/217 |
| 2012/0315550 A1* | 12/2012 | Liu | C01B 25/45 429/338 |
| 2013/0089790 A1* | 4/2013 | Byon | H01G 11/36 429/231.8 |
| 2013/0309162 A1 | 11/2013 | Gilje | |
| 2015/0270548 A1 | 9/2015 | Nesper et al. | |

FOREIGN PATENT DOCUMENTS

| | | |
|---|---|---|
| CN | 101752561 A | 6/2010 |
| CN | 102339994 A | 2/2012 |
| EP | 2256087 A | 12/2010 |
| EP | 2511973 A | 10/2012 |
| JP | 06-060870 | 3/1994 |
| JP | 2001-283834 | 10/2001 |
| JP | 2004-091251 A | 3/2004 |
| JP | 2006-265751 | 10/2006 |
| JP | 2008-084562 A | 4/2008 |
| JP | 2009-170384 A | 7/2009 |
| JP | 2009-524567 | 7/2009 |
| JP | 2009-176721 | 8/2009 |
| JP | 2010-205609 A | 9/2010 |
| JP | 2010-222245 A | 10/2010 |
| JP | 2010-275186 A | 12/2010 |
| JP | 2011-503804 | 1/2011 |
| JP | 2011-048992 | 3/2011 |
| JP | 2011-060559 A | 3/2011 |
| JP | 2011-517053 | 5/2011 |
| JP | 2013-054958 A | 3/2013 |
| JP | 2013-538933 | 10/2013 |
| WO | WO-2006-062947 A2 | 6/2006 |
| WO | WO 2006-071076 A1 | 7/2006 |
| WO | WO-2007-061945 A2 | 5/2007 |
| WO | WO-2009-061685 A1 | 5/2009 |
| WO | WO-2009-127901 A1 | 10/2009 |
| WO | WO-2009-144600 A2 | 12/2009 |
| WO | WO-2010/050491 | 5/2010 |
| WO | WO-2011/141486 | 11/2011 |

OTHER PUBLICATIONS

Yu.G et al., "Solution-Processed Graphene/MnO$_2$ Nanostructured Textiles for High-Performance Electrochemical Capacitors,", Nano Letters, 2011, vol. 11, No. 7, pp. 2905-2911.
Kang.B et al., "Battery Materials for Ultrafast Charging and Discharging,", Nature, Mar. 12, 2009, vol. 458, No. 12, pp. 190-193.
Padhi.A et al., "Phospho-olivines as Positive-Electrode Materials for Rechargeable Lithium Batteries,", J. Electrochem. Soc. (Journal of the Electrochemical Society), Apr. 1, 1997, vol. 144, No. 4, pp. 1188-1194.
Zhou.X et al., "Graphene modified LiFePO$_4$ cathode materials for high power lithium ion batteries ,", J. Mater. Chem. (Journal of Materials Chemistry), 2011, vol. 21, pp. 3353-3358.

(56) References Cited

OTHER PUBLICATIONS

Paek.S et al., "Enhanced Cyclic Performance and Lithium Storage Capacity of $SnO_2$/Graphene Nanoporous Electrodes with Three-Dimensionally Delaminated Flexible Structre,", Nano Letters, 2009, vol. 9, No. 1, pp. 72-75.

Wang.G et al., "Sn/graphene nanocomposite with 3D architecture for enhanced reversible lithium storage in lithium ion batteries,", J. Mater. Chem. (Journal of Materials Chemistry), 2009, vol. 19, No. 44, pp. 8378-8384.

Wang.D et al., "Self-Assembled $TiO_2$-Graphene Hybrid Nanostructures for Enhanced Li-Ion Insertion,", ACS Nano, 2009, vol. 3, No. 4, pp. 907-914.

Zhao.X et al., "In-Plane Vacancy-Enabled High-Power Si-Graphene Composite Electrode for Lithium-Ion Batteries,", Advanced Energy Materials, 2011, vol. 1, pp. 1079-1084.

Chinese Office Action (Application No. 201310059609.1) Dated Feb. 3, 2016.

Chen.Q et al., "Polyimide/graphene hybrids with controllable electric performance", Oct. 29, 2010, pp. 268-269.

\* cited by examiner

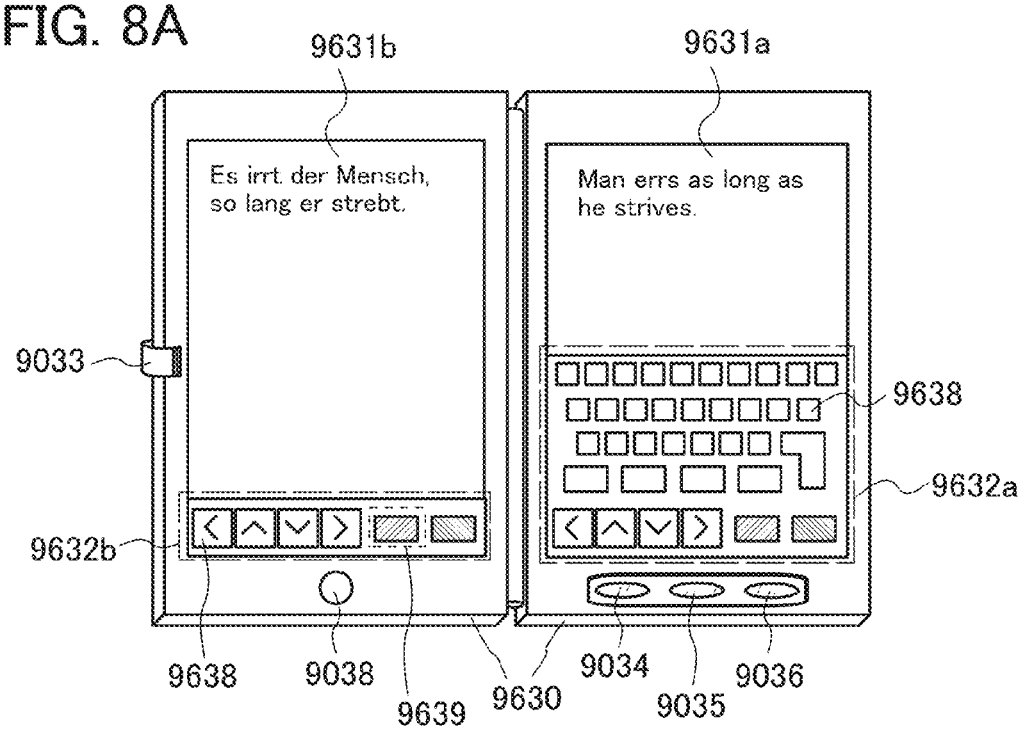
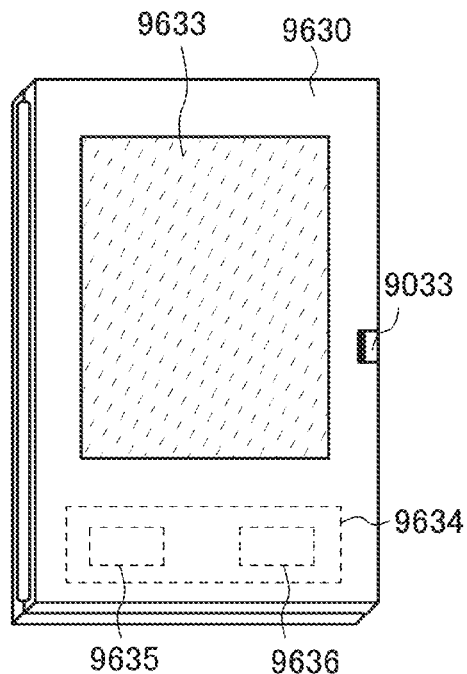
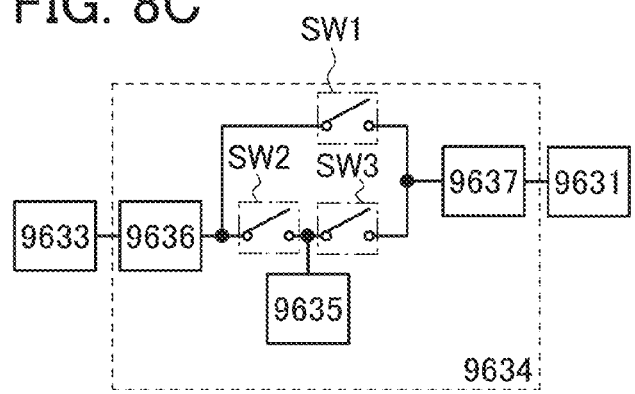

METHOD FOR FORMING NEGATIVE ELECTRODE AND METHOD FOR MANUFACTURING LITHIUM SECONDARY BATTERY

BACKGROUND OF THE INVENTION

1. Field of the Invention

One embodiment of the disclosed invention relates to a method for forming a negative electrode and a method for manufacturing a lithium secondary battery.

2. Description of the Related Art

In recent years, portable devices such as smartphones and portable game consoles have become widespread. Further, with growing interest in environmental issues, hybrid cars and electric cars have attracted attention; thus, secondary batteries typified by lithium secondary batteries have gained in importance.

The basic structure of a secondary battery includes a positive electrode, a negative electrode, and an electrolyte (an electrolyte solution or a solid electrolyte) provided therebetween. Typically, the positive electrode and the negative electrode each include a current collector and an active material provided over the current collector. In the case of a lithium secondary battery, a material that can occlude and release lithium ions is used as an active material for a positive electrode and a negative electrode.

To increase the contact area between an active material and an electrolyte, particulate active materials are preferably used. Thus, a binder, a conductive additive, and the like are mixed with the particulate active materials to form an active material layer, and the active material layer is provided over a current collector to form an electrode (positive electrode or negative electrode) in some cases.

As a negative electrode active material, a material that can occlude and release ions serving as carriers (hereinafter referred to as carrier ions), such as carbon or silicon, is used. For example, silicon can occlude approximately ten times as many carrier ions as carbon and thus has higher theoretical capacity and is advantageous in increasing the capacity of the lithium secondary battery.

However, as the amount of occluded carrier ions is increased, the volume of an active material greatly changes with occlusion and release of the carrier ions in a charge and discharge cycle, resulting in lower adhesion between a current collector and silicon and deterioration in battery characteristics due to charge and discharge. Thus, a layer formed of silicon is formed over the current collector and a layer formed of graphite is formed over the layer formed of silicon, whereby deterioration in battery characteristics due to expansion and contraction of the layer formed of silicon is reduced (see Patent Document 1).

Since silicon has lower conductivity than carbon, the surfaces of silicon particles are coated with graphite and an active material layer including the silicon particles is formed over a current collector, whereby a negative electrode including the active material layer with increased conductivity is formed.

On the other hand, the use of graphene as a conductive electronic material in semiconductor devices has been studied recently. Graphene refers to a one-atom-thick sheet of carbon molecules having π bonds.

Graphene is chemically stable and has favorable electric characteristics and thus has been expected to be applied to channel regions of transistors, vias, wirings, and the like included in the semiconductor devices. In addition, to improve the conductivity of an electrode material for a lithium secondary battery, particulate active materials are coated with graphite or graphene (see Non-Patent Document 1).

REFERENCE

Patent Document

[Patent Document 1] Japanese Published Patent Application No. 2001-283834

Non-Patent Document

[Non-Patent Document 1] "In-Plane Vacancy-Enabled High-Power Si-Graphene Composite Electrode for Lithium-Ion Batteries", Xin Zhao, Cary M. Hayner, Mayfair C. Kung, and Harold H. Kung, Adv. Energy Mater., 2011, 1, 1079-1084.

SUMMARY OF THE INVENTION

In Non-Patent Document 1, graphene oxide is reduced by heating it at 700° C. for 1 hour in an argon atmosphere or an argon atmosphere containing 10% hydrogen.

Moreover, "Si-graphene paper" is formed by heating silicon nanoparticles and the reduced graphene oxide.

As described above, two heating steps are needed for forming an electrode (negative electrode) in Non-Patent Document 1.

Further, as described above, an active material layer formed by mixing a binder, a conductive additive, and the like with particulate active materials is provided over a current collector to form an electrode in some cases. In a formation process of an electrode (negative electrode), however, when slurry including silicon which is an active material, graphene oxide, and a binder is heated at the elevated temperature of 700° C. for example, the binder might be decomposed and the electrode (negative electrode) might deteriorate.

A lithium secondary battery including the electrode (negative electrode) which deteriorates due to the decomposed binder might be a power storage device with low reliability.

In view of the above, an object of one embodiment of the disclosed invention is to reduce the number of steps in a formation process of an electrode.

Further, an object of one embodiment of the disclosed invention is to suppress deterioration of an electrode.

Furthermore, an object of one embodiment of the disclosed invention is to provide a highly reliable lithium secondary battery by suppressing deterioration of an electrode.

In one embodiment of the disclosed invention, slurry including silicon which is an active material, graphene oxide, and a precursor of polyimide which is a binder are baked so that the precursor of the polyimide is imidized. In addition, the graphene oxide is reduced in the heating step for imidization of the precursor of the polyimide. In other words, the baking step of the slurry and the reduction step of the graphene oxide are performed at the same time. This makes it possible to reduce the number of steps in a formation process of an electrode.

Further, in one embodiment of the disclosed invention, heating temperature in the step of baking the slurry and the step of reducing the graphene oxide is set so that the polyimide that is the binder (more precisely, the precursor of the polyimide) is not decomposed. Thus, the decomposition of the binder can be prevented. In addition, heating at a temperature at which the binder is not decomposed can suppress deterioration of the electrode, leading to prevention of reduction in the reliability of the lithium secondary battery.

Further, reduced graphene oxide has a low dispersion property. In the case where an active material (e.g., silicon nanoparticles in Non-Patent Document 1) and reduced graphene oxide are mixed, they might not be mixed uniformly. In such a case, a manufactured lithium secondary battery might have inferior electric characteristics.

Graphene oxide is formed by oxidizing graphite, and a functional group formed by the oxidation contributes to a dispersion property; therefore, the graphene oxide has a high dispersion property. In the reduction of the graphene oxide, however, the number of functional groups which contribute to the dispersion property is decreased due to the reduction; therefore, the reduced graphene oxide has a low dispersion property.

In an electrode (negative electrode) formed by heating a mixture of graphene oxide and an active material, the graphene oxide is dispersed before the number of functional groups is decreased due to reduction; thus, the reduced graphene oxide is dispersed uniformly. A lithium secondary battery using such an electrode (negative electrode) has an advantage of good electric characteristics.

One embodiment of the disclosed invention is a method for forming a negative electrode which includes the steps of mixing graphene oxide, a plurality of particulate negative electrode active materials, and a precursor of polyimide to form slurry; applying the slurry over a negative electrode current collector; and heating the slurry applied over the negative electrode current collector at a temperature higher than or equal to 200° C. and lower than or equal to 400° C. so that the precursor of the polyimide is imidized. The graphene oxide is reduced in the step of heating the slurry to imidize the precursor of the polyimide.

One embodiment of the disclosed invention is a method for manufacturing a lithium secondary battery which includes the step of forming a negative electrode by mixing graphene oxide, a plurality of particulate negative electrode active materials, and a precursor of polyimide to form slurry; applying the slurry over a negative electrode current collector; heating the slurry applied over the negative electrode current collector at a temperature higher than or equal to 200° C. and lower than or equal to 400° C. so that the precursor of the polyimide is imidized, and the graphene oxide is reduced in heating the slurry to imidize the precursor of the polyimide; the step of forming a positive electrode active material layer over a positive electrode current collector to form a positive electrode; and the step of providing an electrolyte between the positive electrode and the negative electrode.

In one embodiment of the disclosed invention, the particulate negative electrode active materials are silicon particles.

In one embodiment of the disclosed invention, the negative electrode current collector is titanium, aluminum, copper, or stainless steel.

According to one embodiment of the disclosed invention, the number of steps can be reduced in a formation process of an electrode.

According to one embodiment of the disclosed invention, deterioration of an electrode can be suppressed.

According to one embodiment of the disclosed invention, a highly reliable lithium secondary battery can be provided by suppressing deterioration of an electrode.

Further, according to one embodiment of the disclosed invention, an electrode including reduced graphene oxide which is dispersed uniformly can be provided.

Furthermore, according to one embodiment of the disclosed invention, with the use of an electrode including reduced graphene oxide which is dispersed uniformly, a lithium secondary battery with good electric characteristics can be provided.

BRIEF DESCRIPTION OF THE DRAWINGS

FIGS. 8A to 8C illustrate an electrical appliance.

DETAILED DESCRIPTION OF THE INVENTION

Figure 1:
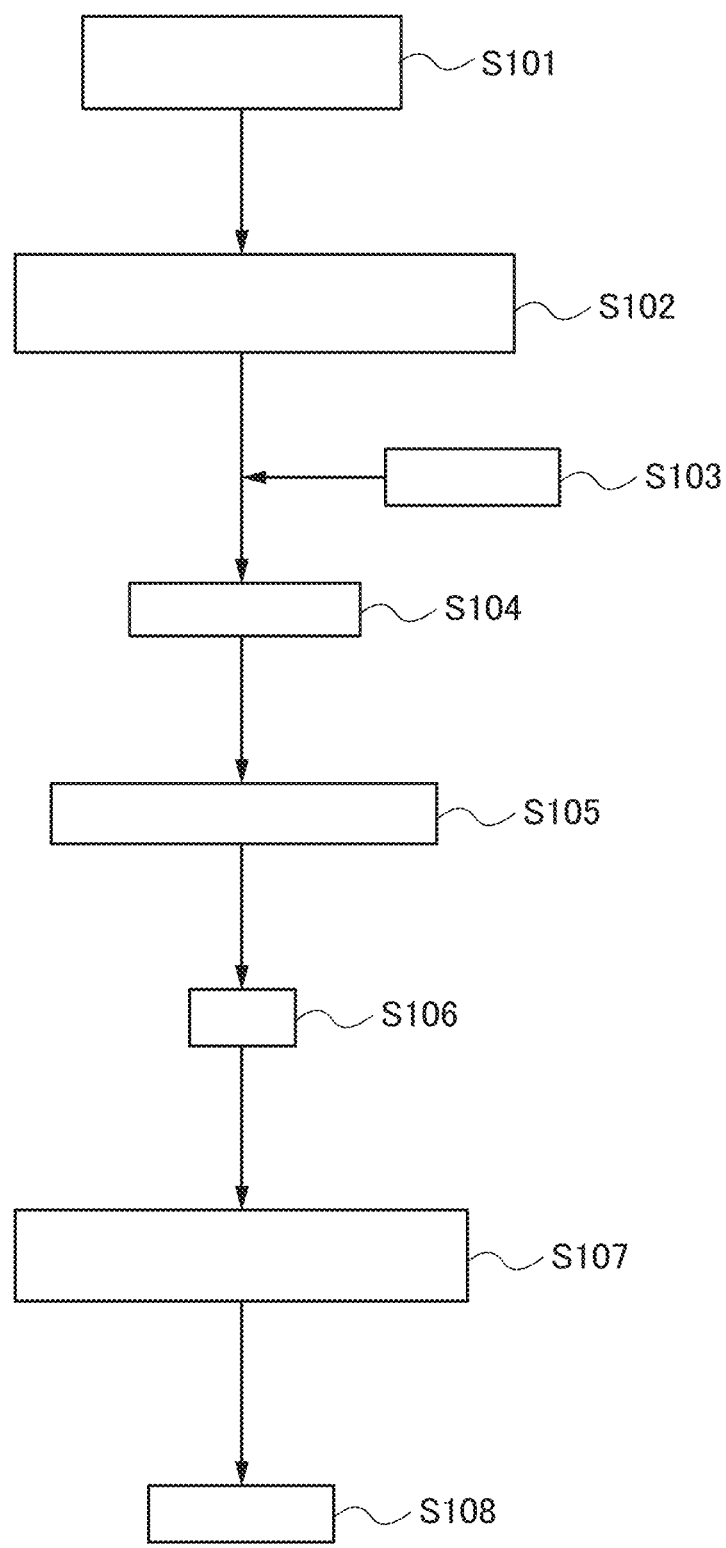
FIG. 1 is a flow chart of a formation process of a negative electrode.

Embodiments of the invention disclosed in this specification are described below with reference to the drawings. Note that the invention disclosed in this specification can be carried out in a variety of different modes, and it is easily understood by those skilled in the art that the modes and details of the invention disclosed in this specification can be changed in various ways without departing from the spirit and scope thereof. Therefore, the present invention is not construed as being limited to description of the embodiments and examples. Note that in the drawings shown below, the same portions or portions having similar functions are denoted by the same reference numerals, and repeated description thereof is omitted. Further, in some cases, similar parts are denoted by the same hatching patterns and are not necessarily designated by reference numerals.

Note that the position, size, range, or the like of each structure illustrated in the drawings and the like is not accurately represented in some cases for easy understanding. Therefore, the disclosed invention is not necessarily limited to the position, size, range, or the like as disclosed in the drawings and the like.

In this specification and the like, ordinal numbers such as "first", "second", and "third" are used in order to avoid confusion among components, and the terms do not mean limitation of the number of components.

Embodiment 1

In this embodiment, first, a negative electrode of a lithium secondary battery and a method for forming the negative electrode are described with reference to FIG. 1.

<Method for Forming Negative Electrode>

First, a method for forming graphene oxide is described. For example, graphene oxide can be formed by a method for forming a dispersion containing graphite oxide by mixing a sulfuric acid solution of potassium permanganate, hydrogen peroxide water, or the like into single crystal graphite powder to cause oxidation reaction. The graphite oxide has functional groups such as an epoxy group, a carbonyl group, a carboxyl group, and a hydroxyl group due to oxidation of carbon in graphite.

Since the graphite oxide has such functional groups, the interlayer distance between adjacent graphenes of a plurality of graphenes is longer than the interlayer distance in graphite.

Next, ultrasonic vibration is applied to the dispersion containing the graphite oxide, so that the graphite oxide whose interlayer distance is long can be cleaved to separate graphene oxide and to form a dispersion containing the graphene oxide. A solvent is removed from the dispersion containing the graphene oxide, whereby the graphene oxide can be obtained (Step S101).

In a solution having polarity, different graphene oxides are not easily aggregated because the graphene oxides are negatively charged due to a functional group. Thus, the graphene oxide is uniformly dispersed in the solution having polarity.

The length of one side (also referred to as a flake size) of the graphene oxide which is used is preferably several micrometers to several tens of micrometers.

Note that in this specification, graphene refers to a one-atom-thick sheet of carbon molecules having pores, through which ions of lithium or the like can pass, or a stack of 2 to 100 layers of the sheets. The stack can also be referred to as reduced multilayer graphene.

A single-layer graphene (the one-atom-thick sheet of carbon molecules) contains six-membered rings each composed of carbon atoms, which are connected in the planar direction, and many-membered rings each formed when a carbon bond in part of a six-membered ring is broken, such as a seven-membered ring, an eight-membered ring, a nine-membered ring, and a ten-membered ring.

Further, graphene oxide in this specification refers to graphene in which an oxygen atom is bonded to a six-membered ring or a many-membered ring each composed of carbon atoms. Specifically, the graphene oxide in this specification refers to graphene in which an epoxy group, a carbonyl group, a carboxyl group, a hydroxyl group, or the like is bonded to a six-membered ring or a many-membered ring each composed of carbon atoms. For this reason, in the graphene oxide in this specification, the proportion of oxygen atoms in the total number of carbon atoms, the oxygen atoms, and nitrogen atoms is greater than 15 at. %. In the graphene oxide, a graphene oxide salt is formed in some cases depending on a formation method. The graphene oxide salt is, for example, a salt in which an ammonium group, an amino group, an alkali metal, or the like is bonded to an epoxy group, a carbonyl group, a carboxyl group, or a hydroxyl group bonded to a six-membered ring or a many-membered ring each composed of carbon atoms. In this speciation, the graphene oxide includes a graphene oxide salt in its category. Note that the graphene oxide and the graphene oxide salt each include the one-atom-thick sheet or the stack of 2 to 100 layers of the sheets, and the stack can also be referred to as multilayer graphene oxide or a multilayer graphene oxide salt.

Note that in this specification, reduced graphene oxide can be referred to as graphene oxide which is reduced to have π bonds of carbon atoms (in other words, sp$^2$ orbitals derived from the C=C bond). In the graphene oxide, the proportion of C=C bonds in the total number of the C=C bonds, C—C bonds, C—H bonds, C—O bonds, C=O bonds, and O=C—O bonds is preferably greater than or equal to 5%.

Further, the reduced graphene oxide can also be referred to as graphene oxide reduced to contain a decreased proportion of oxygen. In the graphene oxide, the proportion of oxygen atoms in the total amount of carbon atoms, the oxygen atoms, and nitrogen atoms is greater than or equal to 2 at. % and less than or equal to 20 at. %, preferably greater than or equal to 3 at. % and less than or equal to 15 at. %.

Furthermore, the reduced graphene oxide can also be referred to as graphene oxide reduced to have increased conductivity due to formation of π bonds of carbon atoms. The electrical conductivity of the graphene oxide is preferably $10^{-6}$ S/m or higher.

Note that for the graphene oxide, commercial graphene oxide or a commercial graphene oxide dispersion may be used.

Next, particulate negative electrode active materials, the graphene oxide, and a binder are mixed (Step S102).

As described above, as the negative electrode active materials, a material that can occlude and release carrier ions, such as silicon, can be used. Silicon can occlude approximately ten times as many carrier ions as carbon, and thus has higher theoretical capacity and is advantageous in increasing the capacity of a power storage device.

Alternatively, as the negative electrode active materials, lithium, aluminum, a carbon-based material, tin, tin oxide, silicon oxide, silicon carbide, a silicon alloy, germanium, or the like can be used other than silicon. Further alternatively, a compound containing one or more materials selected from lithium, aluminum, a carbon-based material, tin, tin oxide, silicon, silicon oxide, silicon carbide, a silicon alloy, and germanium, may be used. Silicon, a silicon alloy, germanium, lithium, aluminum, or tin is preferably used because the amount of lithium ions capable of being occluded by silicon, a silicon alloy, germanium, lithium, aluminum, or tin is larger than that capable of being occluded by a carbon-based material.

In this embodiment, silicon particles are used as the particulate negative electrode active materials.

Note that an active material refers to a material that relates to insertion and extraction of ions functioning as carriers. When an electrode (a positive electrode, a negative electrode, or both of them) is formed, an active material layer in which the active material is mixed with a conductive additive, a binder, a solvent, and the like is formed over a current collector. Thus, the active material and the active material layer are distinguished. Therefore, a positive electrode active material and a positive electrode active material layer are distinguished and a negative electrode active material and a negative electrode active material layer are distinguished.

Silicon has lower conductivity than carbon, and the conductivity is further reduced when silicon becomes amorphous by charge and discharge. Thus, a negative electrode in which silicon is used as an active material has low conductivity. However, since graphene has high conductivity, coating silicon with graphene enables electrons to transfer at higher speed in the graphene through which carrier ions pass. That is, graphene also functions as a conductive additive. In addition, since graphene has a thin sheet-like shape, covering a plurality of silicon particles with the graphene can further increase the silicon content in an active material layer. That is, graphene also functions as a binder. Covering the plurality of silicon particles with the graphene can increase the silicon content in the active material layer and makes transfer of carrier ions easier than in graphite. As a result, the conductivity of carrier ions can be increased, reactivity of silicon which is the active material and carrier ions can be enhanced, and thus carrier ions can be easily occluded by silicon. Thus, a non-aqueous secondary battery using the negative electrode can be charged and discharged at high speed.

Further, in this embodiment, a binder with high heat resistance, such as polyimide, is used as the binder. Note that a substance mixed in the mixing step (Step S102) is a precursor of polyimide, and the precursor of the polyimide is imidized in the heating step performed later to be the polyimide.

As a method for mixing the particulate negative electrode active materials, the graphene oxide, and the binder, for example, ball mill treatment can be used. Specifically, the particulate negative electrode active materials, the graphene oxide, and the binder are weighed and a solvent is added thereto (Step S103), the mixture is put into a container together with metallic balls or ceramic balls, and the container is rotated, for example. With the ball mill treatment, the particulate negative electrode active materials, the graphene oxide, and the binder can be mixed and formed into fine particles, so that an electrode material that is to be formed can be fine particles. Further, with the ball mill treatment, the particulate negative electrode active materials, the graphene oxide, and the binder, which are raw materials of the negative electrode, can be mixed uniformly. As the solvent, a solvent in which the raw materials are not dissolved but dispersed can be used. In this embodiment, silicon particles with an average diameter of 60 nm as the negative electrode active materials, graphene oxide as a conductive additive and a binder, and polyimide as a binder are weighed so that the ratio by weight of the silicon particles to the graphene oxide and the binder is 40:40:20. Thus, the silicon particles that are the negative electrode active materials have the same mass as the graphene oxide. Further, in this embodiment, N-methylpyrrolidone (NMP) is used as the solvent.

Through the above steps, the particulate negative electrode active materials, the graphene oxide, the binder, and the solvent are mixed to form slurry (Step S104).

Next, the slurry is applied over a negative electrode current collector (Step S105). Then, a drying step is performed to dry the slurry so that the solvent is removed (Step S106). The drying step can be performed in a dry atmosphere at room temperature, for example. Note that in the case where the solvent can be removed in the heating step performed later, the drying step does not necessarily have to be performed.

For the negative electrode current collector, a conductive material such as titanium, aluminum, copper, or stainless steel which is processed into a foil shape, a plate shape, a net shape, or the like can be used. In this embodiment, titanium foil is used as the negative electrode current collector.

Next, the negative electrode current collector to which the slurry is applied is heated. The heating step is performed at a temperature higher than or equal to 200° C. and lower than or equal to 400° C., preferably 300° C. for more than or equal to 1 hour and less than or equal to 2 hours, preferably 1 hour. Through the heating step, the slurry is baked and thus the precursor of the polyimide is imidized to be the polyimide. Through the heating step, the reduction of the graphene oxide also occurs, so that graphene can be formed (Step S107). Thus, a negative electrode active material layer is formed.

In this embodiment, the heating step of baking the slurry can serve as the heating step of reducing the graphene oxide; therefore, there is no need for performing two heating steps. Consequently, the number of steps for forming the negative electrode can be reduced.

Further, in this embodiment, the heating step of baking the slurry and reducing the graphene oxide is performed at a temperature at which the binder is not decomposed, for example, higher than or equal to 200° C. and lower than or equal to 400° C., preferably 300° C. Thus, the decomposition of the binder can be prevented. In addition, heating at a temperature at which the binder is not decomposed can suppress deterioration of the negative electrode, leading to prevention of reduction in the reliability of the lithium secondary battery.

Further, as described above, the reduced graphene oxide has a low dispersion property. In the case where the active material and the reduced graphene oxide are mixed, they might not be mixed uniformly. In such a case, a manufactured lithium secondary battery might have inferior electric characteristics.

The graphene oxide is formed by oxidizing graphite, and a functional group formed by the oxidation contributes to a dispersion property; therefore, the graphene oxide has a high dispersion property. In the reduction of the graphene oxide, however, the number of functional groups which contribute to the dispersion property is decreased due to the reduction; therefore, the reduced graphene oxide has a low dispersion property.

In an electrode (negative electrode) formed by heating a mixture of graphene oxide and an active material, the graphene oxide is dispersed before the number of the functional groups is decreased due to the reduction; thus, the reduced graphene oxide is dispersed uniformly. Therefore, a lithium secondary battery using such an electrode (negative electrode) has an advantage of good electric characteristics.

Through the above steps, the negative electrode including the negative electrode active material layer formed over the negative electrode current collector is formed (Step S108).

<Structure of Negative Electrode>

Figure 2A:
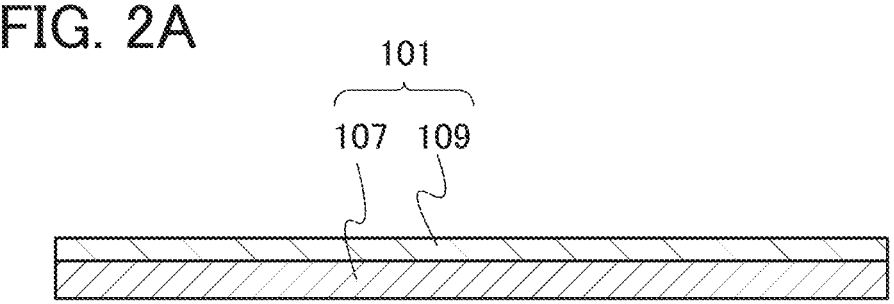
FIGS. 2A to 2C are a cross-sectional view and top views of a negative electrode.
Figure 2B:
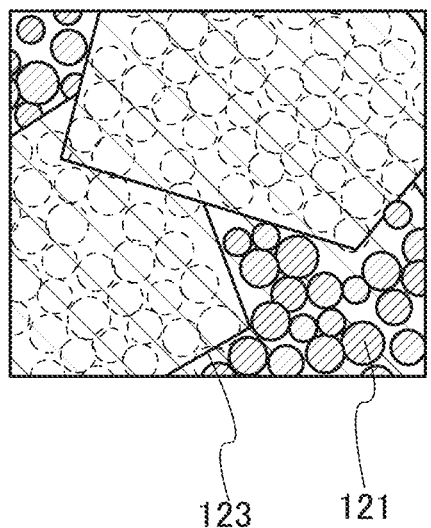
Figure 2C:
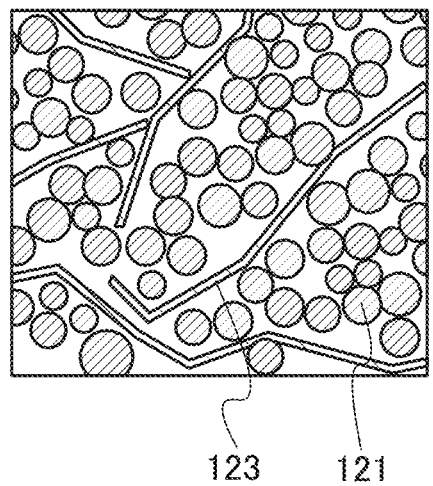

The negative electrode formed in the above steps is illustrated in FIGS. 2A to 2C. FIG. 2A is a cross-sectional view of a negative electrode 101. In the negative electrode 101, a negative electrode active material layer 109 is formed over a negative electrode current collector 107. The above-described material and a negative electrode current collector with the above-described shape may be used for the negative electrode current collector 107.

FIG. 2B is a top view of the negative electrode active material layer 109 including particulate negative electrode active materials 121 that can occlude and release carrier ions, sheets of graphene 123 (the reduced graphene oxide) each covering and at least partly surrounding part of the negative electrode active materials 121, and a binder. The different sheets of the graphene 123 cover surfaces of part of the negative electrode active materials 121. The negative electrode active materials 121 may partly be exposed.

Although sufficient characteristics can be obtained even when the surfaces of the negative electrode active materials 121 are not coated with the graphene 123, the negative electrode active materials 121 are preferably coated with the graphene 123 sufficiently, in which case hopping of carrier ions occurs between the negative electrode active materials 121, so that current flows easily.

FIG. 2C is a cross-sectional view of part of the negative electrode active material layer 109 in FIG. 2B. The negative electrode active material layer 109 includes the negative electrode active materials 121 and the sheets of the graphene 123 each covering part of the negative electrode active materials 121. The sheets of the graphene 123 are observed to have linear shapes in the cross-sectional view. Part of the negative electrode active materials 121 are at least partly surrounded with one sheet of the graphene or plural sheets of the graphene. That is, part of the negative electrode active materials 121 exists within one sheet of the graphene or plural sheets of the graphene. Note that the sheet of the graphene has a bag-like shape and part of the negative electrode active materials 121 are at least partly surrounded with the bag-like portion. In addition, the negative electrode active materials 121 are partly not covered with the sheets of the graphene 123 and exposed in some cases.

Note that in the negative electrode active materials 121 whose volume is expanded due to occlusion of carrier ions, the negative electrode active material layer 109 becomes brittle through charge and discharge cycles and thus the negative electrode active material layer 109 might be partly broken. The negative electrode active material layer 109 which is partly broken decreases the reliability of a power storage device. However, even when the volume of the negative electrode active materials 121 expands through charge and discharge cycles, the graphene 123 partly covers the periphery of the negative electrode active materials 121, which allows prevention of dispersion of the negative electrode active materials 121 and the break of the negative electrode active material layer 109. In other words, the graphene 123 has a function of maintaining the bond between the negative electrode active materials 121 even when the volume of the negative electrode active materials 121 is increased and decreased by charge and discharge.

The graphene 123 is partly in contact with the negative electrode active materials 121 and also functions as a conductive additive. Further, the graphene 123 has a function of holding the negative electrode active materials 121 capable of occluding and releasing carrier ions. Therefore, the proportion of the negative electrode active materials in the negative electrode active material layer 109 can be increased, resulting in an increase in the discharge capacity of the lithium secondary battery.

Figure 3:
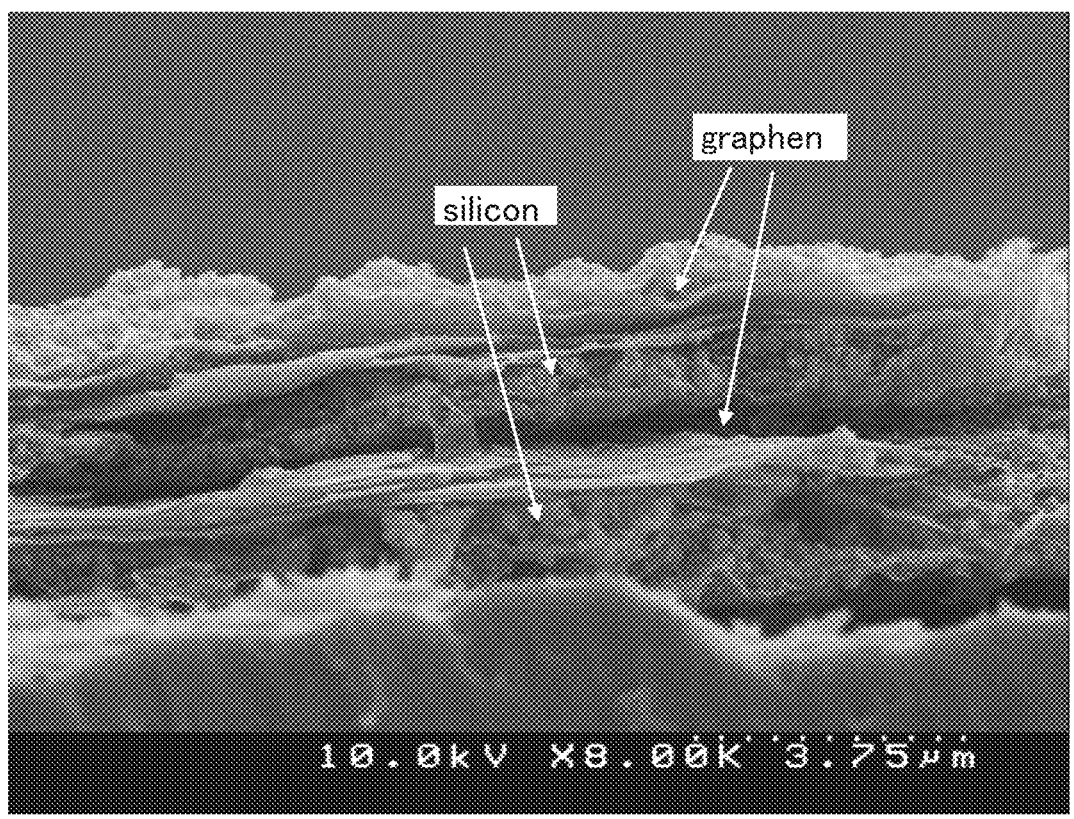
FIG. 3 is a cross-sectional SEM image of a negative electrode active material layer.

FIG. 3 is a cross-sectional SEM image of the negative electrode active material layer 109 in this embodiment. The cross-sectional SEM image in FIG. 3 shows a plurality of silicon particles sandwiched between a plurality of layers of graphene. In other words, the plurality of silicon particles is covered with the plurality of layers of graphene. Thus, with silicon coated with graphene having high conductivity, electrons can be transferred at high speed. Further, although the amount of carrier ions that can be occluded by silicon is approximately ten times that of carrier ions that can be occluded by carbon, silicon has a high coefficient of volume expansion due to occlusion of carrier ions. However, as described above, since the periphery of the plurality of silicon particles is covered with the graphene, it is possible to prevent dispersion of the silicon particles and the break of the negative electrode active material layer 109 due to the dispersion of the silicon particles.

According to this embodiment, the number of steps can be reduced in the formation process of an electrode.

According to this embodiment, deterioration of an electrode can be suppressed.

According to this embodiment, deterioration of an electrode can be suppressed and thus a highly reliable power storage device can be provided.

Further, according to this embodiment, an electrode including reduced graphene oxide which is dispersed uniformly can be provided.

Furthermore, according to this embodiment, with the use of an electrode including reduced graphene oxide which is dispersed uniformly, a lithium secondary battery with good electric characteristics can be provided.

Embodiment 2

In this embodiment, one mode of a structure of a lithium secondary battery and a method for manufacturing the lithium secondary battery are described below.

Figure 4A:
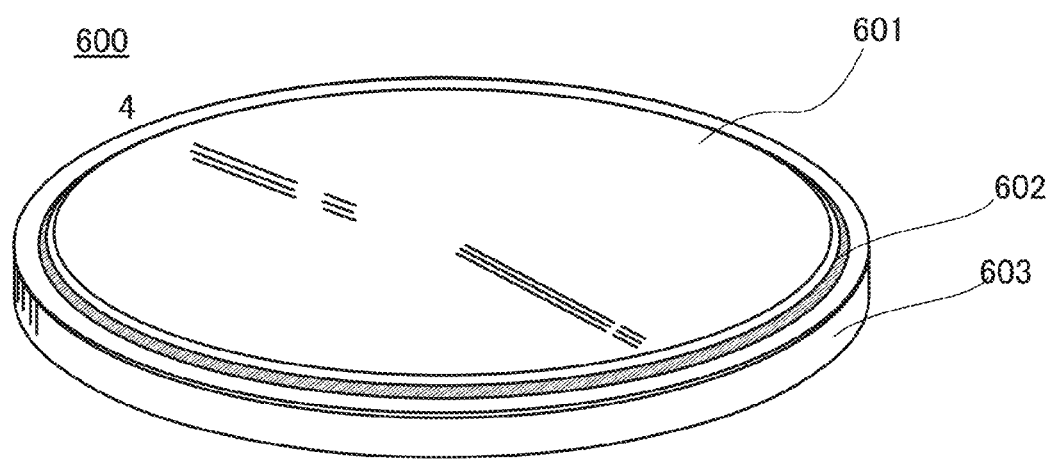
FIGS. 4A and 4B illustrate a coin-type lithium secondary battery.
Figure 4B:
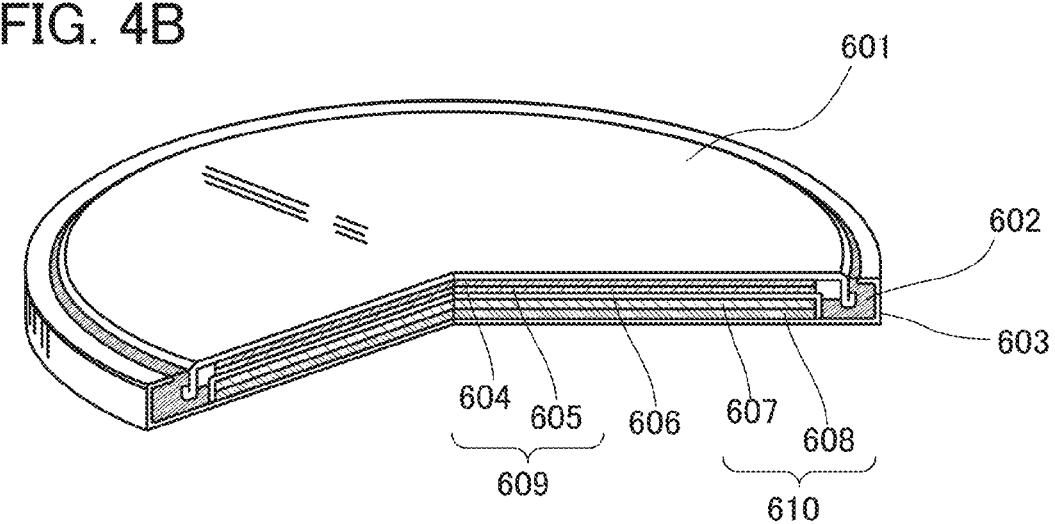

FIG. 4A is an external view of a coin-type (single-layer and flat) lithium secondary battery, and FIG. 4B is a cross-sectional view thereof.

In a coin-type lithium secondary battery 600, a positive electrode can 603 serving also as a positive electrode terminal and a negative electrode can 601 serving also as a negative electrode terminal are insulated and sealed with a gasket 602 formed of polypropylene or the like. A positive electrode 610 includes a positive electrode current collector 608 and a positive electrode active material layer 607 provided in contact therewith. On the other hand, a negative electrode 609 includes a negative electrode current collector 604 and a negative electrode active material layer 605 provided in contact therewith. A separator 606 and a non-aqueous electrolyte solution (not illustrated) as an electrolyte in a liquid state are included between the positive electrode active material layer 607 and the negative electrode active material layer 605.

The negative electrode 101 described in Embodiment 1 can be used as appropriate as the negative electrode 609.

As the positive electrode current collector 608 and the positive electrode active material layer 607, a positive electrode current collector and a positive electrode active material layer which are described below can be used as appropriate.

The positive electrode current collector 608 can be formed using a material having high conductivity such as stainless steel, gold, platinum, zinc, iron, copper, aluminum, or titanium, or an alloy thereof. Alternatively, the positive electrode current collector 608 can be formed using an aluminum alloy to which an element which improves heat resistance, such as silicon, titanium, neodymium, scandium, or molybdenum, is added. Further alternatively, the positive electrode current collector 608 may be formed using a metal element which forms silicide by reacting with silicon. Examples of the metal element which forms silicide by reacting with silicon include zirconium, titanium, hafnium, vanadium, niobium, tantalum, chromium, molybdenum, tungsten, cobalt, nickel, and the like. The positive electrode current collector 608 can have a foil-like shape, a plate-like shape (sheet-like shape), a net-like shape, a punching-metal shape, an expanded-metal shape, or the like, as appropriate.

As a material of the positive electrode active material layer 607, a compound such as $LiFeO_2$, $LiCoO_2$, $LiNiO_2$, $LiMn_2O_4$, $V_2O_5$, $Cr_2O_5$, or $MnO_2$ can be used.

Alternatively, an olivine lithium-containing composite oxide (a general formula $LiMPO_4$ (M is one or more of Fe(II), Mn(II), Co(II), and Ni(II))) can be used. Typical examples of the general formula $LiMPO_4$ which can be used as the material are lithium compounds such as $LiFePO_4$, $LiNiPO_4$, $LiCoPO_4$, $LiMnPO_4$, $LiFe_aNi_bPO_4$, Li $Fe_aCo_bPO_4$, $LiFe_aMn_bPO_4$, $LiNi_aCo_bPO_4$, $LiNi_aMn_bPO_4$ ($a+b\le1$, $0<a<1$, and $0<b<1$), $LiFe_cNi_dCo_ePO_4$, $LiFe_cNi_dM-n_ePO_4$, $LiNi_cCo_dMn_ePO_4$ ($c+d+e\le1$, $0<c<1$, $0<d<1$, and $0<e<1$), and $LiFe_fNi_gCo_hMn_iPO_4$ ($f+g+h+i\le1$, $0<f<1$, $0<g<1$, $0<h<1$, and $0<i<1$).

Further alternatively, a composite oxide such as a general formula $Li_{(2-j)}MSiO_4$ (M is one or more of Fe(II), Mn(II), Co(II), and Ni(II); $0\le j\le2$) may be used. Typical examples of the general formula $Li_{(2-j)}MSiO_4$ which can be used as the material are compounds such as $Li_{(2-j)}FeSiO_4$, $Li_{(2-j)}NiSiO_4$, $Li_{(2-j)}CoSiO_4$, $Li_{(2-j)}MnSiO_4$, $Li_{(2-j)}Fe_kNi_lSiO_4$, $Li_{(2-j)}Fe_kCo_lSiO_4$, $Li_{(2-j)}Fe_kMn_lSiO_4$, $Li_{(2-j)}Ni_kCo_lSiO_4$, $Li_{(2-j)}Ni_kMn_lSiO_4$ ($k+l\le1$, $0<k<1$, and $0<l<1$), $Li_{(2-j)}Fe_mNi_nCo_qSiO_4$, $Li_{(2-j)}Fe_mNi_nMn_qSiO_4$, $Li_{(2-j)}Ni_mCo_nMn_qSiO_4$ ($m+n+q\le1$, $0<m<1$, $0<n<1$, and $0<q<1$), and $Li_{(2-j)}Fe_rNi_sCo_tMn_uSiO_4$ ($r+s+t+u\le1$, $0<r<1$, $0<s<1$, $0<t<1$, and $0<u<1$).

In the case where carrier ions are alkali metal ions other than lithium ions, alkaline-earth metal ions, beryllium ions, or magnesium ions, the positive electrode active material layer 607 may contain, instead of lithium in the lithium compound and the composite oxide, an alkali metal (e.g., sodium or potassium), an alkaline-earth metal (e.g., calcium, strontium, or barium), beryllium, or magnesium.

The positive electrode active material layer 607 is not necessarily formed directly on the positive electrode current collector 608. Between the positive electrode current collector 608 and the positive electrode active material layer 607, any of the following functional layers may be formed using a conductive material such as metal: an adhesive layer for the purpose of improving adhesiveness between the positive electrode current collector 608 and the positive electrode active material layer 607, a planarization layer for reducing unevenness of the surface of the positive electrode current collector 608, a heat radiation layer for radiating heat, and a stress relaxation layer for reducing stress on the positive electrode current collector 608 or the positive electrode active material layer 607.

Further, the positive electrode active material layer 607 may contain graphene similarly to the negative electrode active material layer 109 in Embodiment 1. Description is given below of the case where graphene is contained in the positive electrode active material layer 607.

Figure 5A:
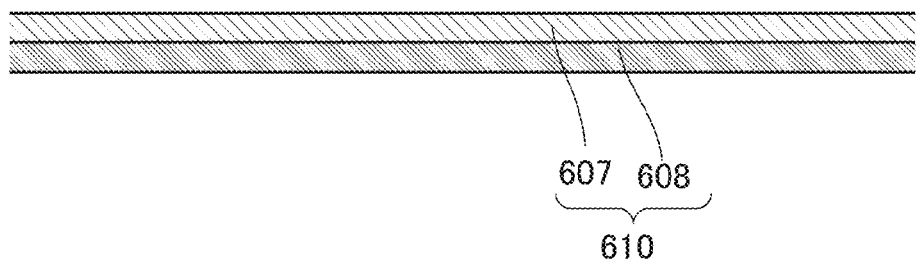
FIGS. 5A to 5C are a cross-sectional view and top views of a positive electrode.
Figure 5B:
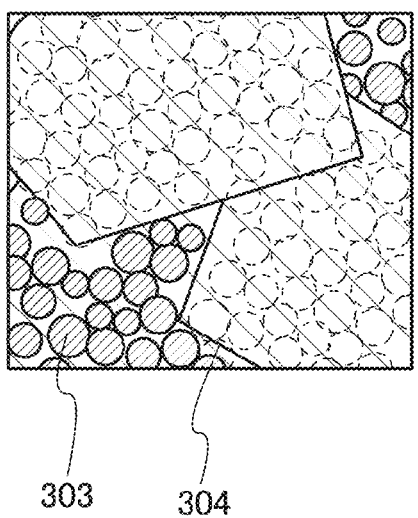

FIG. 5A is a cross-sectional view of the positive electrode 610 including the positive electrode current collector 608 and the positive electrode active material layer 607 provided partly in contact therewith. FIG. 5B is a top view of the positive electrode active material layer 607 including particulate positive electrode active materials 303 that can occlude and release carrier ions, and sheets of graphene 304 each covering and at least partly surrounding part of the positive electrode active materials 303. The different sheets of the graphene 304 cover surfaces of part of the positive electrode active materials 303. The positive electrode active materials 303 may be partly exposed.

Although sufficient characteristics can be obtained even when the surfaces of the positive electrode active materials 303 are not coated with the graphene 304, it is preferable to use the positive electrode active materials 303 coated with the graphene 304, in which case hopping of carrier ions occurs between the positive electrode active materials 303, so that current flows easily.

Figure 5C:
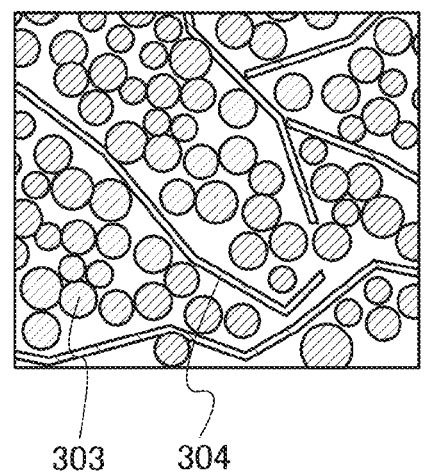

FIG. 5C is a cross-sectional view of part of the positive electrode active material layer 607 in FIG. 5B. The positive electrode active material layer 607 includes the positive electrode active materials 303 and the sheets of the graphene 304 each covering part of the positive electrode active materials 303. The sheets of the graphene 304 are observed to have linear shapes in the cross-sectional view. Part of the positive electrode active materials is at least partly surrounded with one sheet of the graphene or plural sheets of the graphene. That is, part of the positive electrode active materials exists within one sheet of the graphene or plural sheets of the graphene. Note that the sheet of the graphene has a bag-like shape, and part of the positive electrode active materials is at least partly surrounded with the bag-like portion in some cases. In addition, the positive electrode active materials are partly not covered with the sheets of the graphene and exposed in some cases.

Note that the positive electrode active material layer 607 may contain a known conductive additive, for example, acetylene black particles having a volume 0.1 to 10 times as large as that of the graphene or carbon particles such as carbon nanofibers having a one-dimensional expansion.

For the separator 606, an insulator such as cellulose (paper), polypropylene with pores, or polyethylene with pores can be used.

As a solute of the non-aqueous electrolyte solution, a material including carrier ions is used. Typical examples of the solute of the non-aqueous electrolyte solution include lithium salts such as $LiClO_4$, $LiAsF_6$, $LiBF_4$, $LiPF_6$, and $Li(C_2F_5SO_2)_2N$.

In the case where carrier ions are alkali metal ions other than lithium ions, alkaline-earth metal ions, beryllium ions, or magnesium ions, the solute of the non-aqueous electrolyte solution may contain, instead of lithium in the lithium salts, an alkali metal (e.g., sodium or potassium), an alkaline-earth metal (e.g., calcium, strontium, or barium), beryllium, or magnesium.

As a solvent for the non-aqueous electrolyte solution, a material in which carrier ions can transfer is used. As the solvent for the non-aqueous electrolyte solution, an aprotic organic solvent is preferably used. Typical examples of aprotic organic solvents include ethylene carbonate (EC), propylene carbonate, dimethyl carbonate, diethyl carbonate (DEC), γ-butyrolactone, acetonitrile, dimethoxyethane, and tetrahydrofuran, and one or more of these materials can be used. When a gelled high-molecular material is used as the solvent for the non-aqueous electrolyte solution, safety against liquid leakage and the like is improved. Further, a non-aqueous secondary battery can be thinner and more lightweight. Typical examples of gelled high-molecular materials include a silicone gel, an acrylic gel, an acrylonitrile gel, polyethylene oxide, polypropylene oxide, a fluorine-based polymer, and the like. Alternatively, the use of one or more of ionic liquids (room temperature molten salts) which are less likely to burn and volatilize as the solvent for the non-aqueous electrolyte solution can prevent the secondary battery from exploding or catching fire even when the secondary battery internally shorts out or the internal temperature increases due to overcharging or the like.

Instead of the non-aqueous electrolyte solution, a solid electrolyte including a sulfide-based inorganic material, an oxide-based inorganic material, or the like, or a solid electrolyte including a polyethylene oxide (PEO)-based high-molecular material or the like can be used. In the case of using the solid electrolyte, a separator or a spacer is not necessary. Further, the battery can be entirely solidified; therefore, there is no possibility of liquid leakage and thus the safety of the battery is dramatically increased.

For the positive electrode can 603 and the negative electrode can 601, a corrosion-resistant metal such as iron, nickel, aluminum, or titanium, an alloy of such a metal, or an alloy of such a metal and another metal (stainless steel or the like) can be used. It is particularly preferable to plate a corrosive metal with nickel or the like in order to prevent corrosion by the non-aqueous electrolyte solution, which occurs due to charge and discharge of the secondary battery. The positive electrode can 603 and the negative electrode can 601 are electrically connected to the positive electrode 610 and the negative electrode 609, respectively.

The negative electrode 609, the positive electrode 610, and the separator 606 are immersed in the non-aqueous electrolyte solution. Then, as illustrated in FIG. 4B, the positive electrode 610, the separator 606, the negative electrode 609, and the negative electrode can 601 are stacked in this order with the positive electrode can 603 positioned at the bottom, and the positive electrode can 603 and the negative electrode can 601 are subjected to pressure bonding with the gasket 602 interposed therebetween. In such a manner, the coin-type lithium secondary battery 600 is manufactured.

Further, description is given below of a lithium secondary battery having a structure different from that in FIGS. 4A and 4B.

Figure 6A:
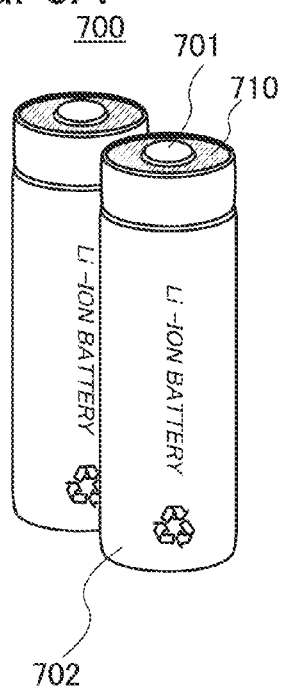
FIGS. 6A and 6B illustrate a cylindrical lithium secondary battery.

A structure of a cylindrical non-aqueous secondary battery is described with reference to FIGS. 6A and 6B. As illustrated in FIG. 6A, a cylindrical lithium secondary battery 700 includes a positive electrode cap (battery cap) 701 on the top surface and a battery can (outer can) 702 on the side surface and bottom surface. The positive electrode cap 701 and the battery can 702 are insulated from each other by a gasket 710 (insulating packing).

Figure 6B:
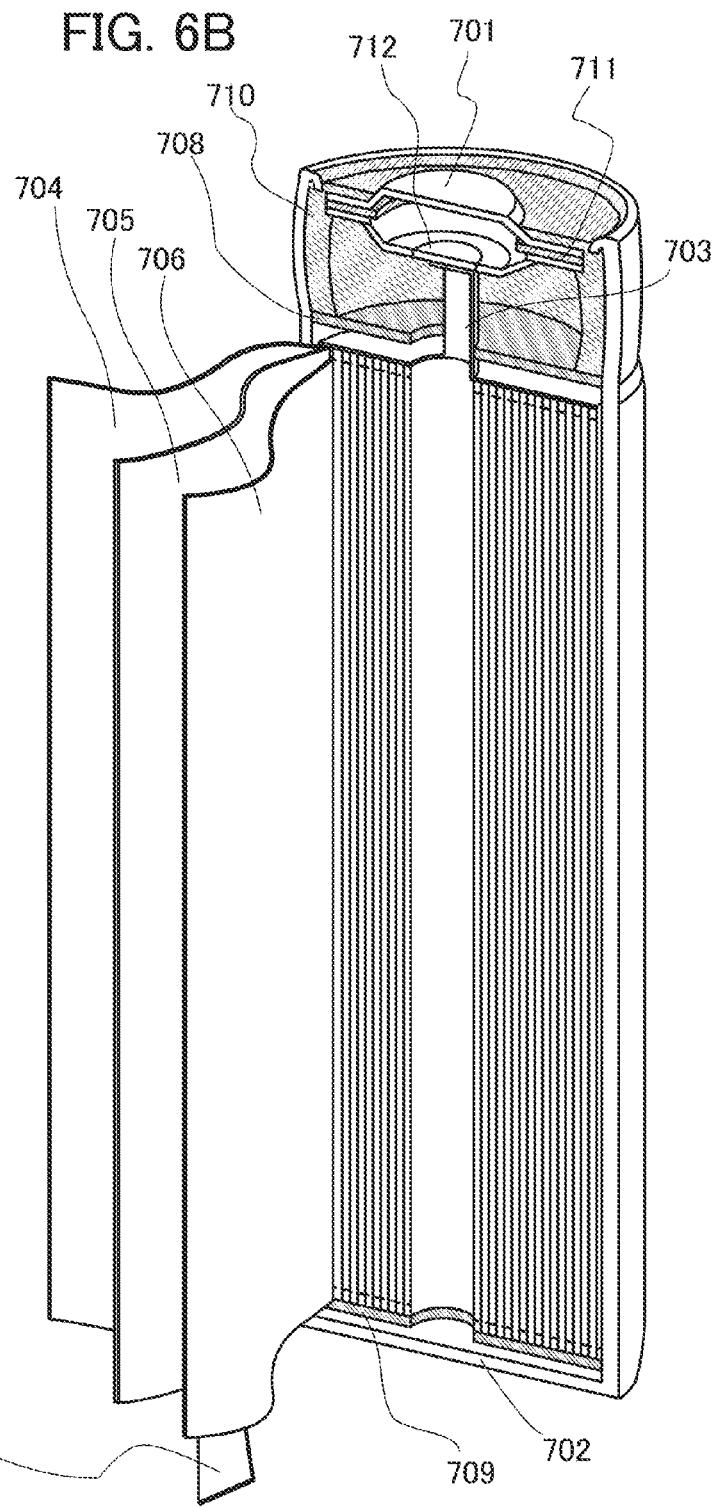

FIG. 6B is a diagram schematically illustrating a cross section of the cylindrical lithium secondary battery. In the battery can 702 with a hollow cylindrical shape, a battery element is provided in which a strip-like positive electrode 704 and a strip-like negative electrode 706 are wound with a separator 705 provided therebetween. Although not illustrated, the battery element is wound around a center pin as a center. One end of the battery can 702 is close and the other end thereof is open. For the battery can 702, a corrosion-resistant metal such as iron, nickel, aluminum, or titanium an alloy of such a metal, or an alloy of such a metal and another metal (stainless steel or the like) can be used. It is particularly preferable to plate a corrosive metal with nickel or the like in order to prevent corrosion by the non-aqueous electrolyte solution, which occurs due to charge and discharge of the secondary battery. Inside the battery can 702, the battery element in which the positive electrode, the negative electrode, and the separator are wound is interposed between a pair of insulating plates 708 and 709 which face each other. Further, a non-aqueous electrolyte solution (not illustrated) is injected inside the battery can 702 in which the battery element is provided. A non-aqueous electrolyte solution which is similar to that of the above coin-type lithium secondary battery can be used.

Although the positive electrode 704 and the negative electrode 706 can be formed in a manner similar to that of the positive electrode and the negative electrode of the coin-type lithium secondary battery 600, the difference lies in that, since the positive electrode and the negative electrode of the cylindrical lithium secondary battery are wound, active materials are formed on both sides of the current collectors. The use of the negative electrode described in Embodiment 1 for the negative electrode 706 enables the secondary battery with high capacity to be manufactured. A positive electrode terminal (positive electrode current collecting lead) 703 is connected to the positive electrode 704, and a negative electrode terminal (negative electrode current collecting lead) 707 is connected to the negative electrode 706. A metal material such as aluminum can be used for both the positive electrode terminal 703 and the negative electrode terminal 707. The positive electrode terminal 703 is resistance-welded to a safety valve mechanism 712, and the negative electrode terminal 707 is resistance-welded to the bottom of the battery can 702. The safety valve mechanism 712 is electrically connected to the positive electrode cap 701 through a positive temperature coefficient (PTC) element 711. The safety valve mechanism 712 cuts off electrical connection between the positive electrode cap 701 and the positive electrode 704 when the internal pressure of the battery increases and exceeds a predetermined threshold value. The PTC element 711 is a heat sensitive resistor whose resistance increases as temperature rises, and controls the amount of current by increase in resistance to prevent unusual heat generation. Barium titanate ($BaTiO_3$)-based semiconductor ceramic or the like can be used for the PTC element.

Note that in this embodiment, the coin-type non-aqueous secondary battery and the cylindrical non-aqueous secondary battery are given as examples of the lithium secondary battery; however, any of non-aqueous secondary batteries with various shapes, such as a sealing-type non-aqueous secondary battery and a square-type non-aqueous secondary battery, can be used. Further, a structure in which a plurality of positive electrodes, a plurality of negative electrodes, and a plurality of separators are stacked or wound may be employed.

This embodiment can be implemented combining with any of the other embodiments as appropriate.

Embodiment 3

A lithium secondary battery of one embodiment of the present invention can be used for power sources of a variety of electrical appliances.

Specific examples of electrical appliances using the lithium secondary battery of one embodiment of the present invention are as follows: display devices of televisions, monitors, and the like, lighting devices, desktop personal computers and laptop personal computers, word processors, image reproduction devices which reproduce still images and moving images stored in recording media such as digital versatile discs (DVDs), portable CD players, portable radios, tape recorders, headphone stereos, stereos, table clocks, wall clocks, cordless phone handsets, transceivers, portable wireless devices, cellular phones, car phones, portable game consoles, calculators, portable information terminals, electronic notebooks, e-book readers, electronic translators, audio input devices, video cameras, digital still cameras, electric shavers, high-frequency heating appliances such as microwave ovens, electric rice cookers, electric washing machines, electric vacuum cleaners, water heaters, electric fans, hair dryers, air-conditioning systems such as air conditioners, humidifiers, and dehumidifiers, dishwashers, dish dryers, clothes dryers, futon dryers, electric refrigerators, electric freezers, electric refrigerator-freezers, freezers for preserving nucleic acids, flashlights, tools such as chain saws, smoke detectors, and medical equipment such as dialyzers. Further, industrial equipment such as guide lights, traffic lights, belt conveyors, elevators, escalators, industrial robots, power storage systems, and power storage devices for leveling the amount of power supply and smart grid can be given. In addition, moving objects driven by an electric motor using power from a lithium secondary battery are also included in the category of the electrical appliances. Examples of the moving objects are electric vehicles (EV), hybrid electric vehicles (HEV) which include both an internal-combustion engine and a motor, plug-in hybrid electric vehicles (PHEV), tracked vehicles in which caterpillar tracks are substituted for wheels of these vehicles, motorized bicycles including motor-assisted bicycles, motorcycles, electric wheelchairs, golf carts, boats, ships, submarines, helicopters, aircrafts, rockets, artificial satellites, space probes, planetary probes, and spacecrafts.

In the above electrical appliances, the lithium secondary battery of one embodiment of the present invention can be used as a main power source for supplying enough power for almost the whole power consumption. Alternatively, in the above electrical appliances, the lithium secondary battery of one embodiment of the present invention can be used as an uninterruptible power source which can supply power to the electrical appliances when the supply of power from the main power source or a commercial power source is stopped. Still alternatively, in the above electrical appliances, the lithium secondary battery of one embodiment of the present invention can be used as an auxiliary power source for supplying power to the electrical appliances at the same time as the power supply from the main power source or a commercial power source.

Figure 7:
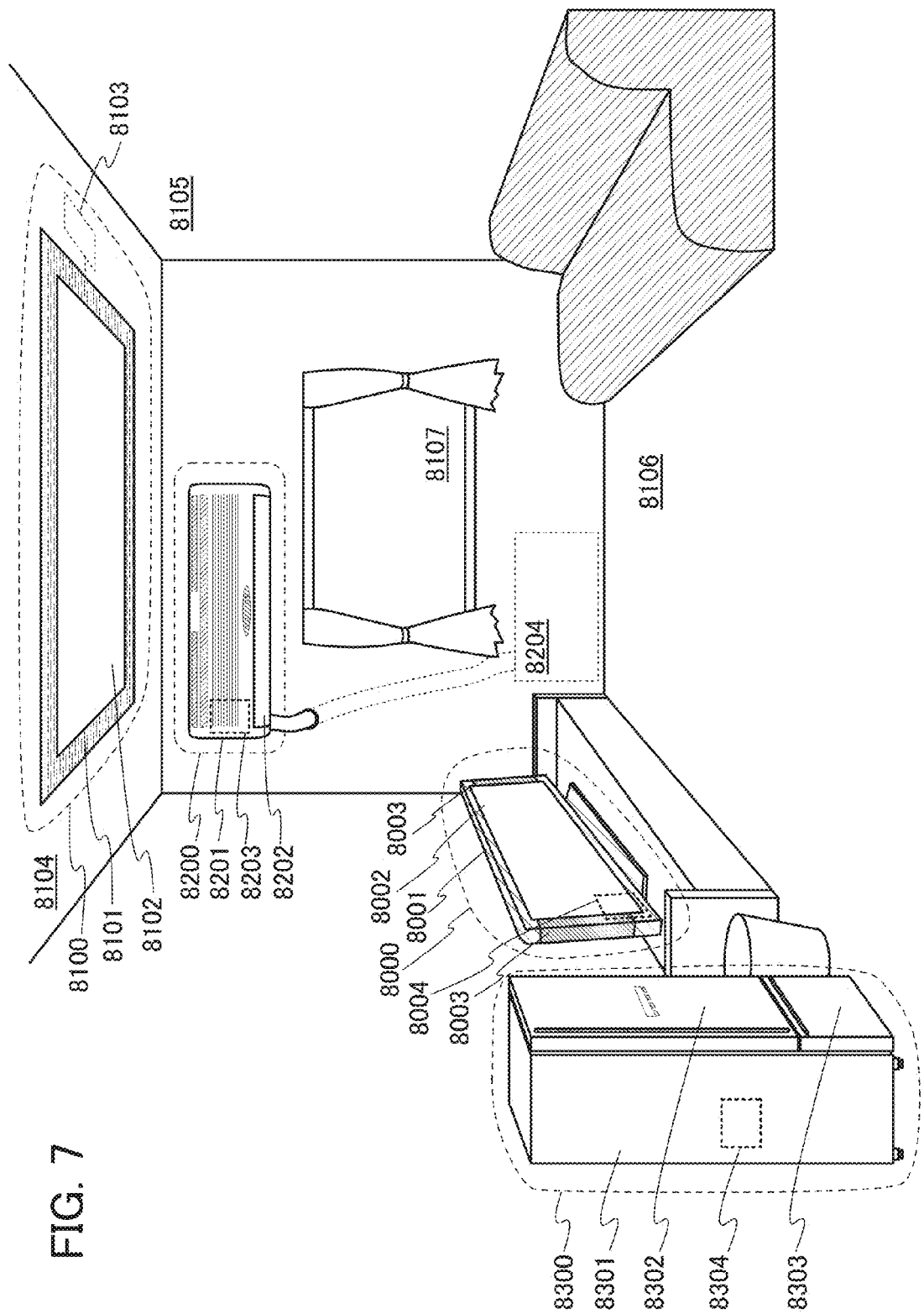
FIG. 7 illustrates electrical appliances.

FIG. 7 illustrates specific structures of the electrical appliances. In FIG. 7, a display device 8000 is an example of an electrical appliance using a lithium secondary battery 8004 of one embodiment of the present invention. Specifically, the display device 8000 corresponds to a display device for TV broadcast reception and includes a housing 8001, a display portion 8002, speaker portions 8003, the lithium secondary battery 8004, and the like. The lithium secondary battery 8004 of one embodiment of the present invention is provided in the housing 8001. The display device 8000 can receive power from a commercial power source. Alternatively, the display device 8000 can use power stored in the lithium secondary battery 8004. Thus, the display device 8000 can be operated with the use of the lithium secondary battery 8004 of one embodiment of the present invention as an uninterruptible power source even when power cannot be supplied from a commercial power source due to power failure or the like.

A semiconductor display device such as a liquid crystal display device, a light-emitting device in which a light-emitting element such as an organic EL element is provided in each pixel, an electrophoretic display device, a digital micromirror device (DMD), a plasma display panel (PDP), or a field emission display (FED) can be used for the display portion 8002.

Note that the display device includes, in its category, all of information display devices for personal computers, advertisement displays, and the like, in addition to TV broadcast reception.

In FIG. 7, an installation lighting device 8100 is an example of an electrical appliance using a lithium secondary battery 8103 of one embodiment of the present invention. Specifically, the installation lighting device 8100 includes a housing 8101, a light source 8102, the lithium secondary battery 8103, and the like. Although FIG. 7 illustrates the case where the lithium secondary battery 8103 is provided in a ceiling 8104 on which the housing 8101 and the light source 8102 are installed, the lithium secondary battery 8103 may be provided in the housing 8101. The installation lighting device 8100 can receive power from a commercial power source. Alternatively, the installation lighting device 8100 can use power stored in the lithium secondary battery 8103. Thus, the installation lighting device 8100 can be operated with the use of the lithium secondary battery 8103 of one embodiment of the present invention as an uninter- ruptible power source even when power cannot be supplied from a commercial power source due to power failure or the like.

Note that although the installation lighting device 8100 provided in the ceiling 8104 is illustrated in FIG. 7 as an example, the lithium secondary battery of one embodiment of the present invention can be used as an installation lighting device provided in, for example, a wall 8105, a floor 8106, a window 8107, or the like other than the ceiling 8104. Alternatively, the lithium secondary battery can be used in a tabletop lighting device or the like.

As the light source 8102, an artificial light source which emits light artificially by using power can be used. Specifically, an incandescent lamp, a discharge lamp such as and a fluorescent lamp, and a light-emitting element such as an LED and an organic EL element are given as examples of the artificial light source.

In FIG. 7, an air conditioner including an indoor unit 8200 and an outdoor unit 8204 is an example of an electrical appliance using a lithium secondary battery 8203 of one embodiment of the present invention. Specifically, the indoor unit 8200 includes a housing 8201, an air outlet 8202, the lithium secondary battery 8203, and the like. Although FIG. 7 illustrates the case where the lithium secondary battery 8203 is provided in the indoor unit 8200, the lithium secondary battery 8203 may be provided in the outdoor unit 8204. Alternatively, the lithium secondary batteries 8203 may be provided in both the indoor unit 8200 and the outdoor unit 8204. The air conditioner can receive power from a commercial power source. Alternatively, the air conditioner can use power stored in the lithium secondary battery 8203. Particularly in the case where the lithium secondary batteries 8203 are provided in both the indoor unit 8200 and the outdoor unit 8204, the air conditioner can be operated with the use of the lithium secondary battery 8203 of one embodiment of the present invention as an uninterruptible power source even when power cannot be supplied from a commercial power source due to power failure or the like.

Note that although the split-type air conditioner including the indoor unit and the outdoor unit is illustrated in FIG. 7 as an example, the lithium secondary battery of one embodiment of the present invention can be used in an air conditioner in which the functions of an indoor unit and an outdoor unit are integrated in one housing.

In FIG. 7, an electric refrigerator-freezer 8300 is an example of an electrical appliance using a lithium secondary battery 8304 of one embodiment of the present invention. Specifically, the electric refrigerator-freezer 8300 includes a housing 8301, a door for a refrigerator 8302, a door for a freezer 8303, the lithium secondary battery 8304, and the like. The lithium secondary battery 8304 is provided inside the housing 8301 in FIG. 7. The electric refrigerator-freezer 8300 can receive power from a commercial power source. Alternatively, the electric refrigerator-freezer 8300 can use power stored in the lithium secondary battery 8304. Thus, the electric refrigerator-freezer 8300 can be operated with the use of the lithium secondary battery 8304 of one embodiment of the present invention as an uninterruptible power source even when power cannot be supplied from a commercial power source due to power failure or the like.

Note that among the electrical appliances described above, a high-frequency heating apparatus such as a microwave oven and an electrical appliance such as an electric rice cooker require high power in a short time. The tripping of a circuit breaker of a commercial power source in use of electrical appliances can be prevented by using the lithium secondary battery of one embodiment of the present invention as an auxiliary power source for supplying power which cannot be supplied enough by a commercial power source.

In addition, in a time period when electrical appliances are not used, particularly when the proportion of the amount of power which is actually used to the total amount of power which can be supplied from a commercial power source (such a proportion referred to as a usage rate of power) is low, power can be stored in the lithium secondary battery, whereby the usage rate of power can be reduced in a time period when the electrical appliances are used. For example, in the case of the electric refrigerator-freezer 8300, power can be stored in the lithium secondary battery 8304 in night time when the temperature is low and the door for a refrigerator 8302 and the door for a freezer 8303 are not often opened and closed. On the other hand, in daytime when the temperature is high and the door for a refrigerator 8302 and the door for a freezer 8303 are frequently opened and closed, the lithium secondary battery 8304 is used as an auxiliary power source; thus, the usage rate of power in daytime can be reduced.

This embodiment can be implemented combining with any of the other embodiments as appropriate.

Embodiment 4

Next, a portable information terminal which is an example of an electrical appliance is described with reference to FIGS. 8A to 8C.

FIGS. 8A and 8B illustrate a tablet terminal that can be folded. FIG. 8A illustrates the tablet terminal in the state of being unfolded. The tablet terminal includes a housing 9630, a display portion 9631*a*, a display portion 9631*b*, a switch 9034 for switching display modes, a power switch 9035, a switch 9036 for switching to power-saving-mode, a fastener 9033, and an operation switch 9038.

Part of the display portion 9631*a* can be a touch panel region 9632*a* and data can be input when a displayed operation key 9638 is touched. Note that FIG. 8A illustrates, as an example, that half of the area of the display portion 9631*a* has only a display function and the other half of the area has a touch panel function. However, the structure of the display portion 9631*a* is not limited to this, and all the area of the display portion 9631*a* may have a touch panel function. For example, all the area of the display portion 9631*a* can display keyboard buttons and serve as a touch panel while the display portion 9631*b* can be used as a display screen.

Like the display portion 9631*a*, part of the display portion 9631*b* can be a touch panel region 9632*b*. When a finger, a stylus, or the like touches the place where a button 9639 for switching to keyboard display is displayed in the touch panel, keyboard buttons can be displayed on the display portion 9631*b*.

Touch input can be performed on the touch panel regions 9632*a* and 9632*b* at the same time.

The switch 9034 for switching display modes can switch the display between portrait mode, landscape mode, and the like, and between monochrome display and color display, for example. With the switch 9036 for switching to power-saving mode, the luminance of display can be optimized depending on the amount of external light at the time when the tablet terminal is in use, which is detected with an optical sensor incorporated in the tablet terminal. The tablet terminal may include another detection device such as a sensor for detecting orientation (e.g., a gyroscope or an acceleration sensor) in addition to the optical sensor.

Although the display area of the display portion 9631*a* is the same as that of the display portion 9631*b* in FIG. 8A, one embodiment of the present invention is not particularly limited thereto. The display area of the display portion 9631*a* may be different from that of the display portion 9631*b*, and further, the display quality of the display portion 9631*a* may be different from that of the display portion 9631*b*. For example, one of them may be a display panel that can display higher-definition images than the other.

FIG. 8B illustrates the tablet terminal in the state of being closed. The tablet terminal includes the housing 9630, a solar cell 9633, a charge and discharge control circuit 9634, a battery 9635, and a DCDC converter 9636. Note that FIG. 8B illustrates an example in which the charge and discharge control circuit 9634 includes the battery 9635 and the DCDC converter 9636, and the battery 9635 includes the lithium secondary battery described in any of the above embodiments.

Since the tablet can be folded, the housing 9630 can be closed when the tablet terminal is not in use. Thus, the display portions 9631*a* and 9631*b* can be protected, thereby providing a tablet terminal with excellent endurance and excellent reliability for long-term use.

The tablet terminal illustrated in FIGS. 8A and 8B can also have a function of displaying various kinds of data (e.g., a still image, a moving image, and a text image), a function of displaying a calendar, a date, the time, or the like on the display portion, a touch-input function of operating or editing data displayed on the display portion by touch input, a function of controlling processing by various kinds of software (programs), and the like.

The solar cell 9633, which is attached on the surface of the tablet terminal, supplies power to the touch panel, the display portion, a video signal processor, and the like. Note that the solar cell 9633 is preferably provided on one or two surfaces of the housing 9630, in which case the battery 9635 can be charged efficiently. The use of the lithium secondary battery of one embodiment of the present invention as the battery 9635 has advantages such as a reduction is size.

The structure and operation of the charge and discharge control circuit 9634 illustrated in FIG. 8B are described with reference to a block diagram in FIG. 8C. The solar cell 9633, the battery 9635, the DCDC converter 9636, a converter 9637, switches SW1 to SW3, and the display portion 9631 are illustrated in FIG. 8C, and the battery 9635, the DCDC converter 9636, the converter 9637, and the switches SW1 to SW3 correspond to the charge and discharge control circuit 9634 illustrated in FIG. 8B.

First, an example of the operation in the case where power is generated by the solar cell 9633 using external light is described. The voltage of power generated by the solar cell is raised or lowered by the DCDC converter 9636 so that the power has a voltage for charging the battery 9635. Then, when the power from the solar cell 9633 is used for the operation of the display portion 9631, the switch SW1 is turned on and the voltage of the power is raised or lowered by the converter 9637 so as to be a voltage needed for the display portion 9631. In addition, when display on the display portion 9631 is not performed, the switch SW1 may be turned off and the switch SW2 may be turned on so that the battery 9635 is charged.

Here, the solar cell 9633 is described as an example of a power generation means; however, there is no particular limitation on the power generation means, and the battery 9635 may be charged with another power generation means such as a piezoelectric element or a thermoelectric conversion element (Peltier element). For example, the battery 9635 may be charged with a non-contact power transmission module that transmits and receives power wirelessly (without contact) to charge the battery or with a combination of other charging means.

It is needless to say that one embodiment of the present invention is not limited to the electrical appliance illustrated in FIGS. 8A to 8C as long as the electrical appliance is equipped with the lithium secondary battery described in any of the above embodiments.

Embodiment 5

Further, an example of the moving object which is an example of the electrical appliance is described with reference to FIGS. 9A and 9B.

Any of the lithium secondary batteries described in Embodiments 1 and 2 can be used as a control battery. The control battery can be externally charged by electric power supply using a plug-in technique or contactless power feeding. Note that in the case where the moving object is an electric railway vehicle, the electric railway vehicle can be charged by electric power supply from an overhead cable or a conductor rail.

Figure 9A:
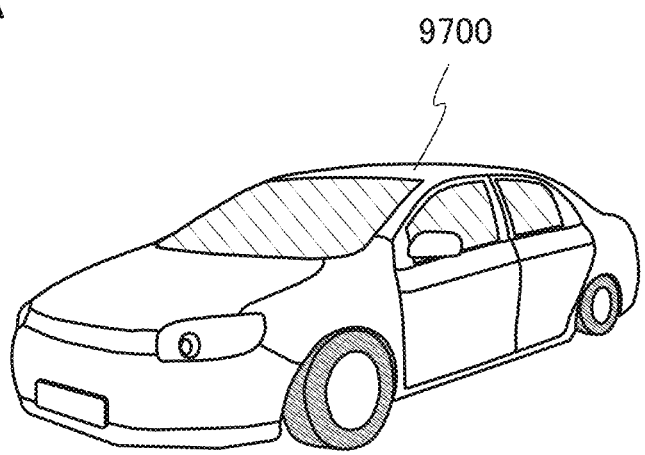
FIGS. 9A and 9B illustrate an electrical appliance.
Figure 9B:
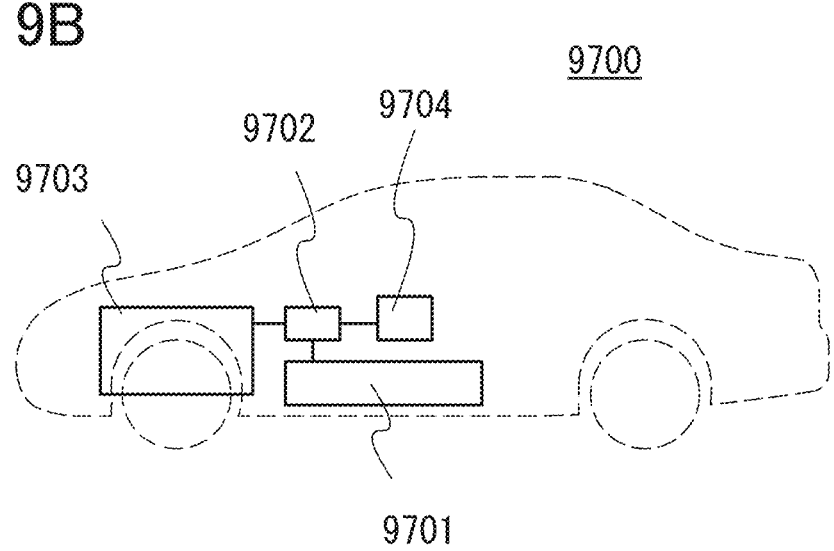

FIGS. 9A and 9B illustrate an example of an electric vehicle. An electric vehicle 9700 is equipped with a lithium secondary battery 9701. The output of the power of the lithium secondary battery 9701 is adjusted by a control circuit 9702 and the power is supplied to a driving device 9703. The control circuit 9702 is controlled by a processing unit 9704 including a ROM, a RAM, a CPU, or the like which is not illustrated.

The driving device 9703 includes a DC motor or an AC motor either alone or in combination with an internal-combustion engine. The processing unit 9704 outputs a control signal to the control circuit 9702 based on input data such as data on operation (e.g., acceleration, deceleration, or stop) by a driver of the electric vehicle 9700 or data on driving the electric vehicle 9700 (e.g., data on an upgrade or a downgrade, or data on a load on a driving wheel). The control circuit 9702 adjusts the electric energy supplied from the lithium secondary battery 9701 in accordance with the control signal of the processing unit 9704 to control the output of the driving device 9703. In the case where the AC motor is mounted, although not illustrated, an inverter which converts direct current into alternate current is also incorporated.

The lithium secondary battery 9701 can be charged by external electric power supply using a plug-in technique. For example, the lithium secondary battery 9701 is charged through a power plug from a commercial power source. The lithium secondary battery 9701 can be charged by converting external power into DC constant voltage having a predetermined voltage level through a converter such as an ACDC converter. When the lithium secondary battery of one embodiment of the present invention is provided as the lithium secondary battery 9701, a shorter charging time can be brought about and improved convenience can be realized. Moreover, the higher charge and discharge rate of the lithium secondary battery 9701 can contribute to greater acceleration and excellent performance of the electric vehicle 9700. When the lithium secondary battery 9701 itself can be made compact and lightweight with improved characteristics of the lithium secondary battery 9701, the vehicle can be made lightweight.

This embodiment can be implemented combining with any of the other embodiments as appropriate.

Example 1

In this example, the electric characteristics of a lithium secondary battery using the negative electrode described in Embodiment 1 are described.

In the negative electrode of this example, 15-µm-thick titanium foil was used as a negative electrode current collector and a mixture was used as a negative electrode active material layer. The mixture was formed by mixing silicon particles (the average diameter thereof is 60 nm) as particulate negative electrode active materials, graphene oxide, and polyimide (more precisely, a precursor of the polyimide) as a binder at a ratio of 40:40:20 (weight %). Specifically, 0.08 g of silicon particles, 0.08 g of graphene oxide, and 0.292 g of a precursor of polyimide were mixed. Note that 13.7% of the precursor of the polyimide was imidized through a heating step to be the polyimide. That is, the weight of the precursor imidized to be the polyimide was 0.04 g (0.292 g×0.137). According to the formation process shown in FIG. 1, the negative electrode active material layer was formed over the negative electrode current collector, whereby the negative electrode was formed.

Note that in the heating step serving as both the step of baking slurry and the step of reducing graphene oxide (Step S107 in FIG. 1), pretreatment was performed in such a manner that heating was performed at 120° C. for 0.5 hours, the temperature was increased to 250° C. and heating was performed at 250° C. for 0.5 hours, and then the temperature was increased to 300° C. and the heating step was performed at 300° C. for 1 hour.

Figure 10:
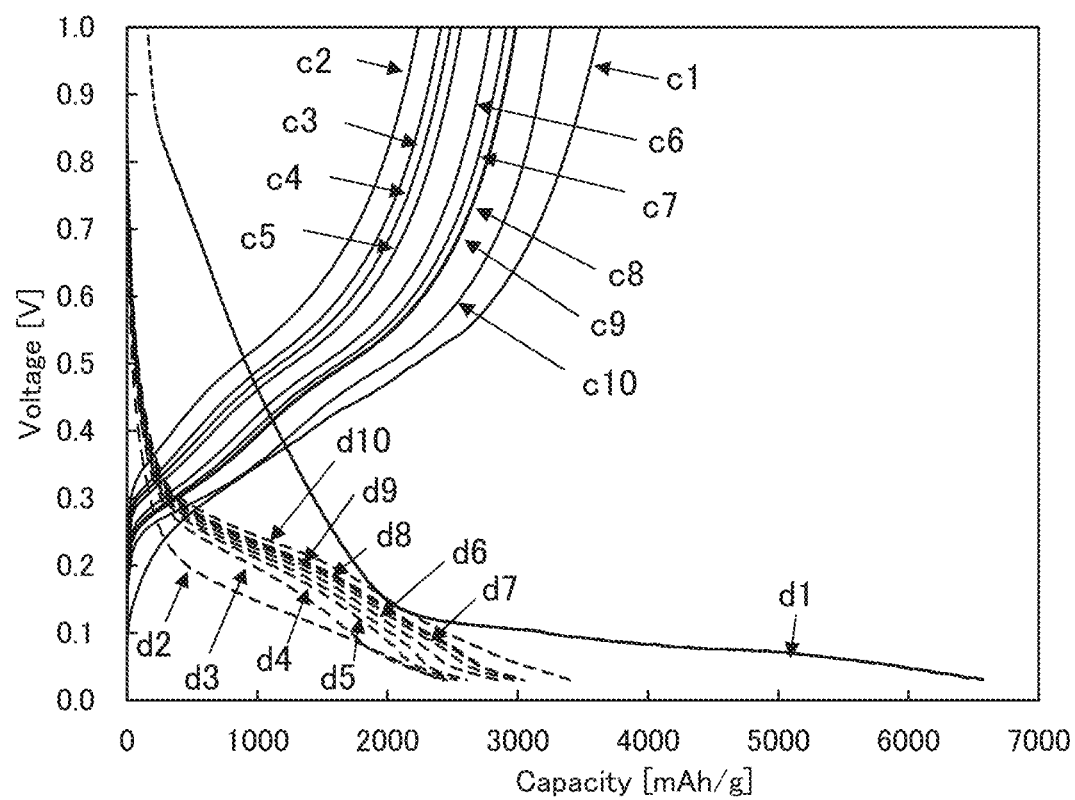
FIG. 10 shows charge and discharge characteristics in Example 1.

FIG. 10 shows the charge and discharge characteristics of the lithium secondary battery using the negative electrode formed as described above. A half cell was formed and the characteristics thereof were measured. For the measurement of the half cell, metallic lithium was used as a positive electrode. In addition, a base cell manufactured by NIPPON TOMUSERU K.K. was used for formation of the half cell.

An electrolyte solution was formed by dissolving lithium hexafluorophosphate ($LiPF_6$) in a mixed solution of ethylene carbonate (EC) and diethyl carbonate (DEC). As a separator, polypropylene was used.

The charge and discharge characteristics shown in FIG. 10 were measured in the following manner. The first charge and discharge were performed at 0.05 C (the current density is 0.1 A/g). This was to store electrical charges in the manufactured secondary battery as many as possible. The second and subsequent charges and discharges were performed at 1 C (the current density is 2 A/g). In the measurement, the charge and discharge were performed at a constant current, and the range of charge and discharge voltage was higher than or equal to 0.03 V and lower than or equal to 1 V. Note that in this specification, one cycle includes one charge and one discharge. That is, in this example, the first cycle was performed at 0.05 C and the second to tenth cycles were performed at 1 C.

FIG. 10 shows the charge and discharge curves obtained by the measurement. In FIG. 10, the vertical axis represents voltage and the horizontal axis represents capacity. In the graph, solid curves are charge curves, and dotted curves are discharge curves. The charge and discharge were performed 10 times in this measurement.

In FIG. 10, "c" represents charge, "d" represents discharge, and numerals represent the number of charges or discharges. Thus, "c5" means the fifth charge, for example.

As shown in FIG. 10, after the first charge and discharge, the capacity of the lithium secondary battery in this example was markedly decreased in the second charge and discharge. This is because of the difference between rates: the first charge and discharge were performed at 0.05 C, and the second charge and discharge were performed at 1 C. When the rate is low (e.g., 0.05 C), time is sufficient for carrier ions to be transferred; therefore, large capacity can be obtained. On the other hand, when the rate is high (e.g., 1 C which is a rate higher than 0.05 C), time is not sufficient for carrier ions to be transferred; therefore, small capacity is obtained.

In the third and subsequent charges and discharges, however, as the charge and discharge were repeated (as the number of cycles increased), both the charge capacity and the discharge capacity were increased. The reason that the charge capacity and the discharge capacity were increased is as follows. Although the graphene oxide was reduced through the heating treatment, there was graphene oxide which was not reduced through the heating treatment and remained in the negative electrode active material layer. The graphene oxide was not sufficiently reduced when the charge and discharge were just started in FIG. 10. However, as the charge and discharge were repeated (as the number of cycles increased), the graphene oxide reduced insufficiently was electrically reduced. Thus, the charge capacity and the discharge capacity were increased as the charge and discharge were repeated.

Example 2

In this example, a negative electrode formed using silicon particles which have shapes different from those in Example 1 as a negative electrode active material, and a lithium secondary battery manufactured using the negative electrode are described.

In the negative electrode of this example, 15-μm-thick titanium foil was used as a negative electrode current collector and a mixture was used as a negative electrode active material layer. The mixture was formed by mixing silicon particles (the average diameter thereof is 3 μm) as particulate negative electrode active materials, graphene oxide, and polyimide (more precisely, a precursor of the polyimide) as a binder at a ratio of 40:40:20 (weight %). Specifically, 0.08 g of silicon particles, 0.08 g of graphene oxide, and 0.292 g of a precursor of polyimide (0.04 g of polyimide) were mixed. According to the formation process shown in FIG. 1, the negative electrode active material layer was formed over the negative electrode current collector, whereby the negative electrode was formed.

Note that in the heating step serving as both the step of baking slurry and the step of reducing graphene oxide (Step S107 in FIG. 1), pretreatment was performed in such a manner that heating was performed at 120° C. for 0.5 hours, the temperature was increased to 250° C. and heating was performed at 250° C. for 0.5 hours, and then the temperature was increased to 300° C. and the heating step was performed at 300° C. for 1 hour.

This example is different from Example 1 in that silicon particles with an average diameter of 5 μm were ground into silicon particles with an average diameter of 3 μm with a microparticulation device and used as silicon particles that are the particulate negative electrode active materials. Specifically, silicon particles with an average diameter of 5 μm (silicon powder) were dispersed in pure water, and the silicon particles are collided with each other ten times at a pressure of 200 MPa. In such a manner, the silicon particles with an average diameter of 5 μm were ground, so that the silicon particles with an average diameter of 3 μm were obtained.

Figure 11A:
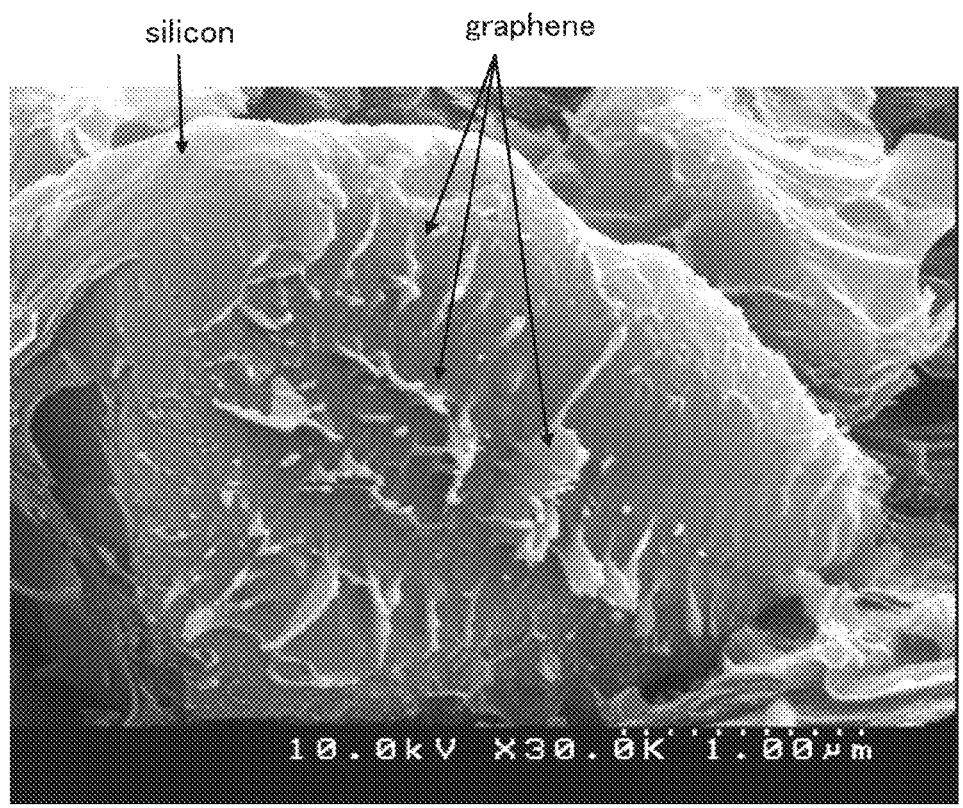
FIGS. 11A and 11B are cross-sectional SEM images of a negative electrode active material layer.
Figure 11B:
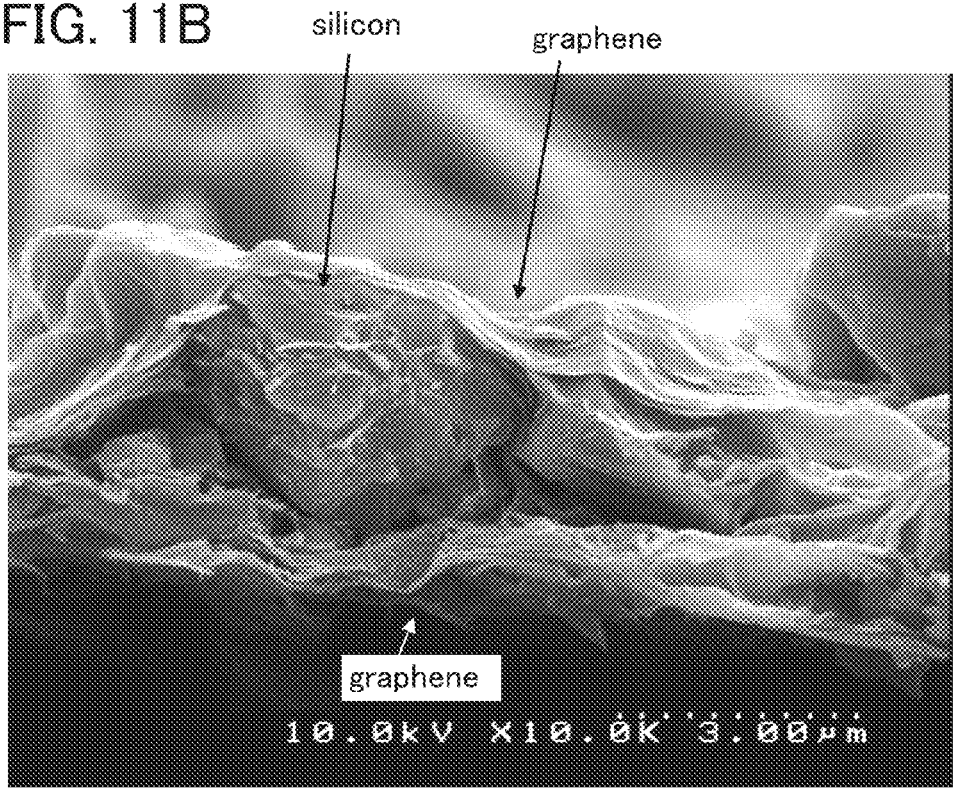

FIGS. 11A and 11B are cross-sectional SEM images of the negative electrode active material layer in this example. The cross-sectional SEM image in FIG. 11A shows that graphene is deposited on the surface of a silicon particle. In addition, FIG. 11B shows a silicon particle sandwiched between a plurality of layers of graphene.

Figure 12:
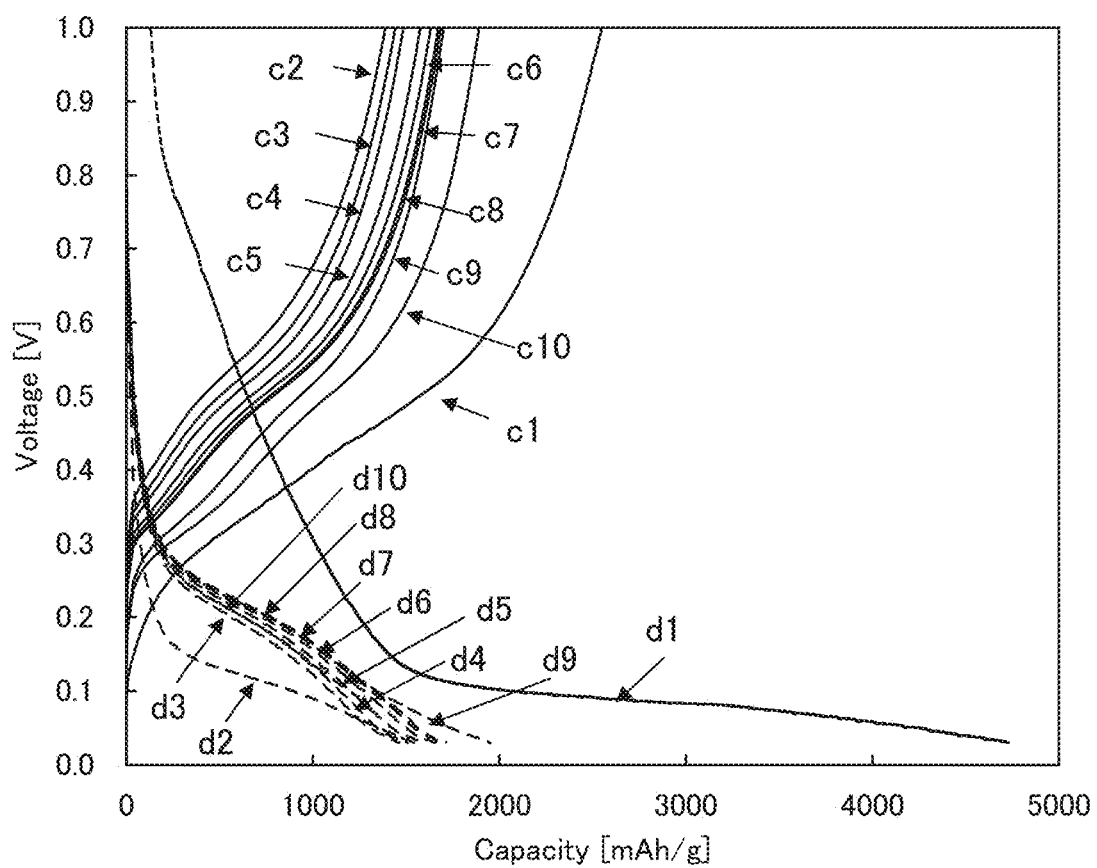
FIG. 12 shows charge and discharge characteristics in Example 2.

FIG. 12 shows the charge and discharge characteristics of the lithium secondary battery using the negative electrode formed as described above. A half cell was formed and the characteristics thereof were measured. For the measurement of the half cell, metallic lithium was used as a positive electrode. In addition, a base cell manufactured by NIPPON TOMUSERU K.K. was used for formation of the half cell.

An electrolyte solution was formed by dissolving lithium hexafluorophosphate ($LiPF_6$) in a mixed solution of ethylene carbonate (EC) and diethyl carbonate (DEC). As a separator, polypropylene was used.

The charge and discharge characteristics shown in FIG. 12 were measured in the following manner. The first charge and discharge were performed at 0.05 C (the current density is 0.1 A/g). This was to store electrical charges in the manufactured secondary battery as many as possible. The second and subsequent charges and discharge were performed at 1 C (the current density is 2 A/g). In the measurement, the charge and discharge were performed at a constant current, and the range of charge and discharge voltage was higher than or equal to 0.03 V and lower than or equal to 1 V.

FIG. 12 shows the charge and discharge curves obtained by the measurement. In FIG. 12, the vertical axis represents voltage and the horizontal axis represents capacity. In the graph, solid curves are charge curves, and dotted curves are discharge curves. The charge and discharge were performed 10 times in this measurement.

In FIG. 12, "c" represents charge, "d" represents discharge, and numerals represent the number of charges or discharges. Thus, "c5" means the fifth charge, for example.

As shown in FIG. 12, after the first charge and discharge, the capacity was markedly decreased in the second charge and discharge. This is because of the difference between rates: the first charge and discharge were performed at 0.05 C, and the second charge and discharge were performed at 1 C. When the rate is low (e.g., 0.05 C), time is sufficient for carrier ions to be transferred; therefore, large capacity can be obtained. On the other hand, when the rate is high (e.g., 1 C which is a rate higher than 0.05 C), time is not sufficient for carrier ions to be transferred; therefore, small capacity is obtained.

In the third and subsequent charges and discharges, however, as the charge and discharge were repeated (as the number of cycles increased), the charge capacity was increased. On the other hand, although tending to increase as the number of cycles increased, the discharge capacity was not increased monotonously even when the number of cycles increased. FIG. 12 shows that as the number of cycles increased, the discharge capacity was increased and decreased repeatedly.

The reason that the charge capacity and the discharge capacity were increased is as follows. Although the graphene oxide was reduced through the heating treatment, there was graphene oxide which was not reduced through the heating treatment and remained in the negative electrode active material layer. The graphene oxide was not sufficiently reduced when the charge and discharge were just started in FIG. 12. However, as the charge and discharge were repeated (as the number of cycles increased), the graphene oxide reduced insufficiently was electrically reduced. Thus, the charge capacity and the discharge capacity were increased as the charge and discharge were repeated.

The reason that the discharge capacity was decreased even when the number of cycles increased is because of deterioration of the electrode and/or the electrolyte solution. Therefore, it can be said that silicon particles that are the particulate negative electrode active materials used in one embodiment of the present invention is preferably fine powder which is like the silicon particles used in Example 1.

Reference Example

In this reference example, description is given of a lithium secondary battery which does not use graphene as a material of a negative electrode active material layer.

In a negative electrode of this reference example, 15-μm-thick titanium foil was used as a negative electrode current collector and a mixture was used as a negative electrode active material layer. The mixture was formed by mixing silicon particles (the average diameter thereof is 5 μm) as particulate negative electrode active materials, ketjen black as a conductive additive, and polyimide (more specifically, a precursor of the polyimide) as a binder at a ratio of 80:5:10 (weight %). Specifically, 0.4 g of silicon particles coated with carbon, 0.025 g of ketjen black, and 0.75 g of a precursor of polyimide were mixed.

After the above materials were mixed, a solvent was added to the mixed materials to form slurry, and the slurry was applied over the negative electrode current collector. Then, the slurry applied over the negative electrode current collector was heated to bake the slurry; thus, the negative electrode in which the negative electrode active material layer was formed over the negative electrode current collector was formed.

Note that in the heating step, the precursor of the polyimide was imidized to be the polyimide.

Note that in this reference example, the silicon particles that are particulate negative electrode active materials were coated with carbon before being mixed. In this specification, the term "be coated with carbon" means that a surface of an active material is coated with a carbon material. The silicon particles coated with carbon are formed in such a manner that a substance which may generate conductive carbon by thermal decomposition (hereinafter referred to as a precursor of conductive carbon) is added to silicon particles, and then heating is performed. As the precursor of conductive carbon, for example, a saccharide, more specifically, glucose may be used.

Specifically, 4 g of silicon particles (the average diameter thereof is 5 μm) and 0.4 g of glucose were mixed and then, acetone was added as a solvent. The silicon particles, the glucose, and the acetone were mixed in a ball mill, and then heated in a nitrogen atmosphere at 600° C. for 10 hours. In such a manner, the silicon particles coated with carbon (silicon particles whose surfaces were coated with a carbon material) were formed.

Figure 13:
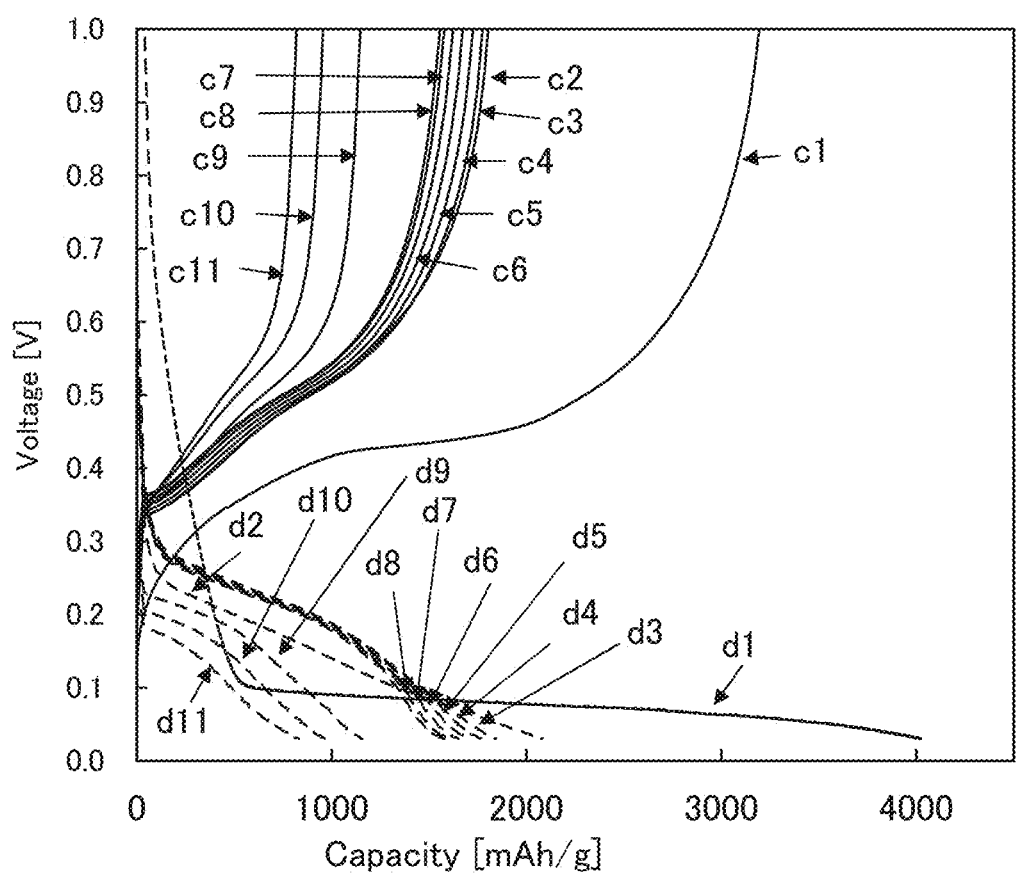
FIG. 13 shows charge and discharge characteristics in Reference Example.

FIG. 13 shows the charge and discharge characteristics of the lithium secondary battery using the negative electrode formed as described above. A half cell was formed and the characteristics thereof were measured. For the measurement of the half cell, metallic lithium was used as a positive electrode. In addition, a base cell manufactured by NIPPON TOMUSERU K.K. was used for formation of the half cell.

An electrolyte solution was formed by dissolving lithium hexafluorophosphate (LiPF$_6$) in a mixed solution of ethylene carbonate (EC) and diethyl carbonate (DEC). As a separator, polypropylene was used.

The charge and discharge characteristics shown in FIG. 13 were measured in the following manner. The first charge and discharge were performed at 0.05 C (the current density is 0.1 A/g). This was to store electrical charges in the manufactured secondary battery as many as possible. The second and subsequent charges and discharges were performed at 1 C (the current density is 2 A/g). In the measurement, the charge and discharge were performed at a constant current, and the range of charge and discharge voltage was higher than or equal to 0.03 V and lower than or equal to 1 V.

FIG. 13 shows the charge and discharge curves obtained by the measurement. In FIG. 13, the vertical axis represents voltage and the horizontal axis represents capacity. In the graph, solid curves are charge curves, and dotted curves are discharge curves. The charge and discharge were performed 10 times in this measurement.

In FIG. 13, "c" represents charge, "d" represents discharge, and numerals represent the number of charges or discharges. Thus, "c5" means the fifth charge, for example.

As shown in FIG. 13, after the first charge and discharge, the capacity of the lithium secondary battery in this reference example was markedly decreased in the second charge and discharge. In the third and subsequent charges and discharges, as the charge and discharge were repeated, the charge capacity was decreased. In addition, as the number of charge and discharge increased, the discharge capacity was decreased.

From this reference example, it is found that when the lithium secondary battery which does not use graphene (reduced graphene oxide) as the material of the negative electrode active material layer is charged and discharged repeatedly, the capacity of the lithium secondary battery is decreased.

On the other hand, when graphene is used as a material of a negative electrode active material layer, the capacity is increased as charge and discharge are repeated, which is preferable. Note that in the case of using graphene for the material of the negative electrode active material layer, reduction of graphene oxide is necessary. A heating step for reducing graphene oxide and a heating step for baking slurry (imidization of a precursor of polyimide) performed separately increase the number of formation steps. However, in one embodiment of the disclosed invention, reduction of graphene oxide and baking of slurry (imidization of a precursor of polyimide) are performed in the same heating step. Thus, it is possible to reduce steps in the formation process of a negative electrode.

This application is based on Japanese Patent Application serial No. 2012-032782 filed with Japan Patent Office on Feb. 17, 2012, the entire contents of which are hereby incorporated by reference.

What is claimed is:

1. A method for forming a negative electrode, comprising the steps of:
  mixing graphene oxide, a plurality of particulate negative electrode active materials, and a precursor of polyimide to form a slurry;
  applying the slurry over a negative electrode current collector; and heating the slurry at a temperature higher than or equal to 200° C. and lower than or equal to 400° C. so that the precursor of the polyimide is imidized, wherein the graphene oxide is reduced in the step of heating the slurry to imidize the precursor of the polyimide, and wherein the plurality of particulate negative electrode active materials comprise lithium, aluminum, tin, tin oxide, silicon oxide, silicon carbide, a silicon alloy, or germanium.

2. The method for forming a negative electrode according to claim 1, wherein the plurality of particulate negative electrode active materials are silicon particles.

3. The method for forming a negative electrode according to claim 1, wherein the negative electrode current collector is titanium, aluminum, copper, or stainless steel.

4. A method for forming a negative electrode, comprising the steps of:
   mixing graphene oxide, a plurality of particulate negative electrode active materials, and a precursor of polyimide to form a slurry;
   applying the slurry over a negative electrode current collector;
   drying the slurry; and
   heating the slurry at a temperature higher than or equal to 200° C. and lower than or equal to 400° C. so that the precursor of the polyimide is imidized,
   wherein the graphene oxide is reduced in the step of heating the slurry to imidize the precursor of the polyimide, and
   wherein the plurality of particulate negative electrode active materials comprise lithium, aluminum, tin, tin oxide, silicon oxide, silicon carbide, a silicon alloy, or germanium.

5. The method for forming a negative electrode according to claim 4, wherein the plurality of particulate negative electrode active materials are silicon particles.

6. The method for forming a negative electrode according to claim 4, wherein the negative electrode current collector is titanium, aluminum, copper, or stainless steel.

7. A method for manufacturing a lithium secondary battery, comprising the steps of:
   forming a negative electrode by:
      mixing graphene oxide, a plurality of particulate negative electrode active materials, and a precursor of polyimide to form a slurry;
      applying the slurry over a negative electrode current collector; and
      heating the slurry at a temperature higher than or equal to 200° C. and lower than or equal to 400° C. so that the precursor of the polyimide is imidized,
      wherein the graphene oxide is reduced in the step of heating the slurry to imidize the precursor of the polyimide;
   forming a positive electrode active material layer over a positive electrode current collector to form a positive electrode; and
   providing an electrolyte between the positive electrode and the negative electrode, and
   wherein the plurality of particulate negative electrode active materials comprise lithium, aluminum, tin, tin oxide, silicon oxide, silicon carbide, a silicon alloy, or germanium.

8. The method for manufacturing a lithium secondary battery according to claim 7, wherein the plurality of particulate negative electrode active materials are silicon particles.

9. The method for manufacturing a lithium secondary battery according to claim 7, wherein the negative electrode current collector is titanium, aluminum, copper, or stainless steel.

10. The method for manufacturing a lithium secondary battery according to claim 7, further comprising the steps of:
   drying the slurry before the steps of heating the slurry.

* * * * *